(12) United States Patent
Lu et al.

(10) Patent No.: US 11,629,273 B2
(45) Date of Patent: Apr. 18, 2023

(54) POLYURETHANE ADHESIVE WITH CHEMICAL RESISTANT

(71) Applicant: 3M INNOVATIVE PROPERTIES COMPANY, St. Paul, MN (US)

(72) Inventors: Yongshang Lu, Woodbury, MN (US); Encai Hao, Woodbury, MN (US); Jianhui Xia, Woodbury, MN (US); Lili Qie, Woodbury, MN (US); David T. Amos, St. Paul, MN (US); Charlie Chia-Tie Ho, Woodbury, MN (US); Lauren A. Polski, Woodbury, MN (US); Richard B. Ross, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 216 days.

(21) Appl. No.: 16/487,491

(22) PCT Filed: Feb. 13, 2018

(86) PCT No.: PCT/US2018/017951
§ 371 (c)(1),
(2) Date: Aug. 21, 2019

(87) PCT Pub. No.: WO2018/160350
PCT Pub. Date: Sep. 7, 2018

(65) Prior Publication Data
US 2020/0056072 A1 Feb. 20, 2020

Related U.S. Application Data

(60) Provisional application No. 62/596,367, filed on Dec. 8, 2017, provisional application No. 62/523,887, filed on Jun. 23, 2017, provisional application No. 62/464,855, filed on Feb. 28, 2017.

(51) Int. Cl.
| | | |
|---|---|---|
| C09J 7/38 | (2018.01) | |
| C09J 175/08 | (2006.01) | |
| C08G 18/66 | (2006.01) | |
| C08G 18/42 | (2006.01) | |
| C08G 18/24 | (2006.01) | |
| C08G 18/32 | (2006.01) | |
| C08G 18/34 | (2006.01) | |
| C08G 18/40 | (2006.01) | |
| C08G 18/48 | (2006.01) | |
| C08G 18/67 | (2006.01) | |
| C08G 18/73 | (2006.01) | |
| C09J 175/14 | (2006.01) | |
| C09J 175/06 | (2006.01) | |

(52) U.S. Cl.
CPC .............. *C09J 7/38* (2018.01); *C08G 18/246* (2013.01); *C08G 18/3206* (2013.01); *C08G 18/348* (2013.01); *C08G 18/4018* (2013.01); *C08G 18/42* (2013.01); *C08G 18/4211* (2013.01); *C08G 18/4233* (2013.01); *C08G 18/4825* (2013.01); *C08G 18/6674* (2013.01); *C08G 18/6692* (2013.01); *C08G 18/6755* (2013.01); *C08G 18/73* (2013.01); *C09J 175/06* (2013.01); *C09J 175/08* (2013.01); *C09J 175/14* (2013.01); *C09J 2475/00* (2013.01)

(58) Field of Classification Search
CPC ........ C09J 7/38; C09J 2475/00; C09J 175/06; C09J 175/14; C09J 174/08; C08G 18/4211; C08G 18/4233; C08G 18/6755; C08G 18/6674; C08G 18/6692
See application file for complete search history.

(56) References Cited

U.S. PATENT DOCUMENTS

| | | |
|---|---|---|
| 3,437,622 A | 4/1969 | Dahl |
| 3,681,277 A | 8/1972 | Scholz |
| 3,718,712 A | 2/1973 | Tushaus |
| 4,087,392 A | 5/1978 | Hartmann |
| 5,591,820 A | 1/1997 | Kydonieus |
| 5,608,000 A | 3/1997 | Duan |
| 5,708,073 A | 1/1998 | Dodge |
| 5,773,490 A | 6/1998 | Shikinami |

(Continued)

FOREIGN PATENT DOCUMENTS

| | | |
|---|---|---|
| CN | 1456630 | 11/2003 |
| CN | 102703015 | 10/2012 |

(Continued)

OTHER PUBLICATIONS

CN-104031225_Zhang et al._09-2014_English Translation.*
Burke, "Solubility Parameters Theory and Application", (2011) [online] [retrieved on Mar. 7, 2016] Retrieved from the Internet <URL http//cool conservation-us.org/coolaic/sg/bpg/annual/v03/bp03-04 html>, pp. 1-20.
Chen, "Preperation and characterization of PEG-modofied polyurethane pressure-sensitive adhesives for transdermal drug delivery", Drug development and industrial pharmacy, 2009, vol. 35, No. 6, pp. 704-711.

(Continued)

*Primary Examiner* — Michael L Leonard
(74) *Attorney, Agent, or Firm* — Carolyn A. Fischer

(57) ABSTRACT

There is provided a pressure sensitive adhesive composition comprising a polyurethane polymer that comprises the reaction product of a polyisocyanate component and a polyol component. The polyol component has a hydrophilic-lipophilic balance (HLB) less than 10. The polyurethane further comprises 0.5 to 10 wt.-% of hydrophilic polymerized units having an HLB greater than 12, such as a reaction product of a polyethylene glycol polymer. In another embodiment, the polyurethane further comprises pendent ethylenically unsaturated groups. Also described are articles such as laminating tapes and protective films as well as methods of bonding substrates with the pressure sensitive adhesive and laminating tape.

36 Claims, No Drawings

(56) References Cited

U.S. PATENT DOCUMENTS

| | | | |
|---|---|---|---|
| 5,945,473 A * | 8/1999 | Kielbania | C08F 283/006 524/457 |
| 6,630,050 B1 | 10/2003 | Moeller | |
| 6,737,477 B1 | 5/2004 | Figge | |
| 6,866,235 B2 | 3/2005 | Zimmermann | |
| 7,160,976 B2 | 1/2007 | Luhmann | |
| 7,326,374 B2 | 2/2008 | Hatanaka | |
| 8,247,514 B2 | 8/2012 | Griswold | |
| 8,669,301 B2 | 3/2014 | Zhao | |
| 2003/0225240 A1 | 12/2003 | Quint | |
| 2004/0068049 A1 | 4/2004 | Wintermantel | |
| 2005/0137375 A1 | 6/2005 | Hansen | |
| 2006/0089452 A1 | 4/2006 | Schneider | |
| 2006/0106189 A1 | 5/2006 | Hesselmans | |
| 2006/0074214 A1 | 6/2006 | Kesselmayer | |
| 2007/0031680 A1 | 2/2007 | Fromwiller | |
| 2009/0240005 A1 | 9/2009 | Kraus | |
| 2009/0260754 A1 | 10/2009 | Te Poel | |
| 2011/0111221 A1 | 5/2011 | Schumann | |
| 2012/0041145 A1 | 2/2012 | Sommer | |
| 2012/0270992 A1 | 10/2012 | Larock | |
| 2013/0014406 A1 | 1/2013 | Weschke | |
| 2013/0143010 A1 | 6/2013 | Buchner | |
| 2013/0309504 A1 | 11/2013 | Nakamura | |
| 2014/0018458 A1 | 1/2014 | Hillshafer | |
| 2014/0039123 A1 | 2/2014 | Iseki | |
| 2014/0065415 A1 | 3/2014 | Sasaki | |
| 2014/0088246 A1 * | 3/2014 | Morikami | C09D 175/04 524/591 |
| 2014/0127504 A1 | 5/2014 | Sasaki | |
| 2015/0056446 A1 * | 2/2015 | Ishiguro | C09J 167/02 428/355 R |
| 2015/0337185 A1 | 11/2015 | Sherman | |
| 2017/0247587 A1 | 8/2017 | Ma | |
| 2018/0010024 A1 * | 1/2018 | Lu | C08G 18/724 |
| 2018/0237671 A1 | 8/2018 | Das | |

FOREIGN PATENT DOCUMENTS

| | | | | |
|---|---|---|---|---|
| CN | 104031225 A | * | 9/2014 | C08G 18/0823 |
| CN | 104628981 | | 5/2015 | |
| DE | 19742217 | | 4/1999 | |
| EP | 2921541 A1 | * | 9/2015 | C08G 18/4238 |
| EP | 3296373 | | 3/2018 | |
| GB | 1127338 A | * | 9/1968 | C08G 18/758 |
| JP | 2000256639 | | 9/2000 | |
| JP | 5867371 | | 2/2016 | |
| JP | 2017-193609 | | 10/2017 | |
| TW | 201502225 | | 1/2015 | |
| TW | 201641636 | | 12/2016 | |
| WO | WO 2000-015728 | | 3/2000 | |
| WO | WO 2002-04536 | | 1/2002 | |
| WO | WO 2009-129292 | | 10/2009 | |
| WO | WO 2014/188865 | | 11/2014 | |
| WO | WO 2015-188067 | | 12/2015 | |
| WO | WO 2016-118399 | | 7/2016 | |
| WO | WO 2018-224937 | | 12/2018 | |

OTHER PUBLICATIONS

Croda, "High performance oleochemicals shaping a natural future in plastics, elastomers & foams", 2009, 4 pages.
Czech, "Crosslinking of the acrylic pressure-sensitive adhesives using polycarbodiimides", Polimery, 2007, vol. 52, pp. 56-60.
Dispercoll® U 42, Product Datasheet, 2013, 3 pages.
Extended EP Search Report, EP 16740523.2, dated Aug. 14, 2018, 6 pages.
Fusion, "VPS/I600 and VPS.I250", 2008, 2pages.
Griffin, "Calculation of HLB Values of Non-Ionic Surfactants," Journal of the Society of Cosmetic Chemists, 1954, vol. 5, pp. 249-256.
Hoy, "Solubility parameter as a design parameter for water borne polymers and coatings",Journal of Coated Fabrics, 1989, vol. 19, pp. 53-67.
Perstorp, "Ymer N0120 Non-ionic dispersing agent for waterborne resins", 13 pages.
Perstorp, "Ymer N120 Product data sheet", 2016, 1page.
Ren, "Synthesis of polyurethane acrylate and application to UV-curable pressure-sensitive adhesive", Designed monomers and polymers, 2005, vol. 8, No. 4, pp. 383-396.
Stepanpol® PH-56, Product Bulletin, 2012, 2 pages.
Stepanpol® PH-56, Stepan Company, [online] [retrieved on Jan. 13, 2015] Retrieved from the Internet <URL http://www.stepan.com/Products/Polymers/STEPANPOL%C2%AE/STEPNPOL%C2%>, 2 pages.
International Search report for PCT International Application No. PCT/US2016/13368 dated Mar. 28, 2016, 3 pages.
International Search report for PCT International Application No. PCT/US2018/017951 dated Jun. 4, 2018, 8 pages.
Li et al., "Preparation and Properties of Hydrophilic Polyurethane Pressure Sensitive Adhesive for Skin," Chemical Industry and Engineering, vol. 21, No. 4, Jul. 2004, pp. 235-238.

* cited by examiner

POLYURETHANE ADHESIVE WITH CHEMICAL RESISTANT

CROSS REFERENCE TO RELATED APPLICATIONS

This application is a national stage filing under 35 U.S.C. 371 of PCT/US2018/017951 filed Feb. 13, 2018, which claims the benefit of U.S. Provisional Application Nos. 62/464,855, filed Feb. 28, 2017, 62/523,887 filed Jun. 23, 2017 and 62/596,367 filed Dec. 08, 2017, the disclosures of which are incorporated by reference in their entirety herein.

SUMMARY OF THE INVENTION

A pressure sensitive adhesive composition is described comprising a polyurethane polymer that comprises the reaction product of a polyisocyanate component and a polyol component. The polyol component has a hydrophilic-lipolphilic balance ("HLB") less than 10.

In one embodiment, the polyurethane further comprises 0.5 to 10 wt.-% of hydrophilic polymerized units having an HLB greater than 12, such as the reaction product of a polyethylene glycol polymer.

In another embodiment, the polyurethane comprises pendent ethylenically unsaturated groups.

In yet another embodiment, the polyurethane comprises both hydrophilic polymerized units and pendent ethylenically unsaturated groups.

Also described are articles such as laminating tapes and protective films as well as methods of bonding substrates with the pressure sensitive adhesive and laminating tape.

DETAILED DESCRIPTION

The polyurethane composition comprises the reaction product of a polyisocyanate component and a polyol component.

The polyol component comprises an aromatic and/or aliphatic polyester or polycaprolactone polyol that comprises at least two hydroxyl terminal groups. When the (e.g. polyester) polyol averages 2 hydroxyl groups, it may be characterized as an (e.g. polyester) diol. In other embodiments, the (e.g. polyester) polyol may be characterized as an (e.g. polyester) triol. In yet other embodiments, the (e.g. polyester) polyol may comprise a mixture of diol and triol, wherein the number of hydroxyl groups averages greater than 2, yet less than 3. Other polyols have 4, 5 or 6 hydroxyl terminal groups. Polyester polyols can be obtained by, for example, an esterification reaction between a polyol component and an acid component. Examples of acid components include succinic acid, methylsuccinic acid, adipic acid, pimelic acid, azelaic acid, sebacic acid, 1,12-dodecanedioic acid, 1,14-tetradecanedioic acid, dimer acid, 2-methyl-1,4-cyclohexanedicarboxylic acid, 2-ethyl-1,4-cyclohexanedicarboxylic acid, terephthalic acid, isophthalic acid, phthalic acid, 1,4-naphthalenedicarboxylic acid, 4,4'-biphenyldicarboxylic acid, and acid anhydrides thereof.

An aromatic polyester polyol can be produced by polymerizing an aromatic dicarboxylic acid with an aliphatic diol, as known in the art. In one embodiments, the aromatic dicarboxylic acid typically comprises a major amount of isophthalic acid or phthalic acid. The polyester polyol may optionally be produced from a minor amount of other aromatic dicarboxylic acid such as terephthalic acid. Further, the polyester polyol may optionally be produced from a minor amount of cycloaliphatic dicarboxylic acids such as 1,3-cyclopentanedicarboxylic acid, 1,2-cyclohexanedicarboxylic acid, 1,4-cyclohexanedicarboxylic acid, 2,5-norbornanedicarboxylic acid, and the like. These dicarboxylic acids are typically in the form of acid anhydrides.

The aliphatic diol utilized to produce the aromatic or aliphatic (e.g. polyester or polycarbonate) polyol typically comprises a straight-chain or branched alkylene group such as ethylene glycol, diethylene glycol, propylene glycol, 1,3-propanediol, 1,3-butanediol, 1,4-butanediol, 1,5-pentanediol, 1,6-hexanediol, 1,7-heptanediol, 1,8-octanediol, 1,9-nonanediol, 1,10-decanediol, 2,4-dimethyl-2-ethylhexane-1,3-diol, 2,2-dimethyl-1,3-propanediol (neopentyl glycol), 2-ethyl-2-butyl-1,3-propanediol, 2-ethyl-2-isobutyl-1,3-propanediol, 3-methyl-1,5-pentanediol, 2,2,4-trimethyl-1,6-hexanediol, octadecanediol, and the like. In typical embodiments, at least one of the aliphatic diols utilized to product the aromatic or aliphatic polyester polyol comprises a straight-chain or branched alkylene group (e.g. $R_1$ in the formulas below) comprising at least 4, 5 or 6 carbon atoms and typically no greater than 24 or no greater than 36. In some embodiments, the straight-chain or branched alkylene group comprises no greater than 12 or 8 carbon atoms. In some embodiments, straight-chain alkylene groups are preferred.

In some embodiments, the polyol is a polycaprolactone polyol as can be obtained by subjecting a cyclic ester monomer such as epsilon-caprolactone or sigma-valerolactone to ring-opening polymerization. Polycaprolactone polyols comprise an alkylene group having 5 carbons atom.

In other embodiments, the polyol component may further comprise polycarbonate polyol as can be obtained from the reaction of aliphatic diols such as butanediol-(1,4) and/or hexanediol-(1,6) with phosgene, diaryl-carbonates such as diphenylcarbonate or with cyclic carbonates such as ethylene or propylene carbonate. Also suitable are polyester carbonates obtained from the above-mentioned polyesters or polylactones with phosgene, diaryl carbonates or cyclic carbonates. The preparation of the polyester or polycarbonate polyol generally includes utilizing at last one aliphatic diol as previously described. The alkylene group of the aliphatic diol and (e.g. aromatic) polyester or polycarbonate polyol may comprise hydrophobic substituents such halogen substituents. One illustrative polycarbonate polyol is available from Bayer Materials Science LLC under the trade designation "Desmophen C2200."

In typical embodiments, a single aliphatic diol is utilized in the preparation of the (e.g. polyester) polyol. In this embodiment, the aliphatic diol comprises an alkylene group comprising at least 4, 5, or 6 carbon atoms as previously described. Alternatively, two or more aliphatic diol may be utilized in the preparation of the (e.g. polyester) polyol wherein at least one of such diols comprises an alkylene group comprising at least 4, 5, or 6 carbon atoms as previously described. When a mixture of aliphatic diols are utilized, at least 50, 60, 70, 80, 90 or 95 wt-% of the total amount of diol (or total $R_1$ alkylene groups) are alkylene groups comprising at least 4, 5, or 6 carbon atoms as previously described.

The polyol is typically a polymer. The (e.g. polyester) polyol typically has an equivalent weight (molecular weight per hydroxyl group) ranging from about 250 to about 30000. In some embodiments, the equivalent weight of the (e.g. polyester) polyol is no greater than 20000, 10000, 8000, 7000, 6000, 5000, 4000, 3500, 3000, 2500, or 2000; or between 500 and 30000, 2000 and 20000, 2000 and 10000, or between 2000 and 4000. In the case of diols, the molecular weight of the (e.g. polyester) polyol is twice that of the equivalent weight just described. In the case of triols, the molecular weight of the (e.g. polyester) polyol is three times the equivalent weight just described. In some embodiments, the polymeric polyol has a molecular weight of less than 4000, 3500, or 3000 g/mole.

In one embodiment, the aliphatic polyester polyol may comprise repeat units comprising an ($R_1$) alkylene group and a terminal ester group or more than one ($R_1$) alkylene group bonded by means of an ester linkage and a terminal ester group.

In another embodiment, the aliphatic polycarbonate polyol may comprise repeat units comprising an ($R_1$) alkylene group and a terminal carbonate group or more than one ($R_1$) alkylene group bonded by means of a carbonate linkage and a terminal carbonate group.

In another embodiment, the aromatic polyester polyol may comprise repeat units comprising an aromatic (e.g. phthalate) group (of the dicarboxylic acid) bonded to the ($R_1$) alkylene group (of the aliphatic diol) by ester linkages. In this embodiment, the ratio of six-member rings to alkylene groups having at least 4, 5, or 6 carbon atoms is about 1:1 and may range from about 1.5:1 to 1:1.5.

The polyol(s) typically have certain solubility parameters computed employing group contribution methods as described in the paper by K. L. Hoy, J. Coated Fabrics, Volume 19, 53 (1989). The calculations were carried out employing the program Molecular Modeling Pro Plus from Norgwyn Montgomery Software, Inc. (North Wales, Pa.)

The polyol typically has a total solubility parameter of at least 9.0, 9.5, and in some embodiments at least 10 $(cal/cm^3)^{1/2}$. The total solubility parameter of the polyol is typically no greater than 14 $(cal/cm^3)^{1/2}$. In some embodiments, the total solubility parameter is no greater than 13, 12.5, 12, 11.5 or 11 $(cal/cm^3)^{1/2}$.

The hydrogen bonding solubility parameter of the polyol is typically at least 2.0, and in some embodiments at least 2.5, 3.0 or 3.5 $(cal/cm^3)^{1/2}$ and typically no greater than 6 $(cal/cm^3)^{1/2}$. In some embodiments, the hydrogen bonding solubility parameter of the polyol is no greater than 5.5 or 5.0 $(cal/cm^3)^{1/2}$. In some embodiments, the dispersion solubility parameter can range from about 7 to 9 $(cal/cm^3)^{1/2}$. In some embodiments, the dispersion solubility parameter can be at least 8. Further, the polar solubility parameter can range from about 2 to 6 $(cal/cm^3)^{1/2}$. In some embodiments, the polar solubility parameter can be at least 3.

The following table depicts illustrative polyols having the solubility parameters just described.

In some embodiments, the polyester polyols just described are more hydrophobic than polypropylene glycol. One way of characterizing the hydrophobicity is the hydrophilic-lipophilic balance ("HLB"). Although various methods have been described for determining the HLB of a compound, unless specified otherwise, as used herein HLB refers to the value obtained by the Griffin's method (See Griffin WC: "Calculation of HLB Values of Non-Ionic Surfactants," Journal of the Society of Cosmetic Chemists 5 (1954): 259). The computations were conducted utilizing the software program Molecular Modeling Pro Plus from Norgwyn Montgomery Software, Inc. (North Wales, Pa.).

According to Griffin's method: HLB=20*Mh/M where Mh is the molecular mass of the hydrophilic portion of the molecule, and M is the molecular mass of the whole molecule. The hydrophilic portions and molecular mass thereof can be determined by various techniques such as Nuclear Magnetic Resonance. This computation provides a numerical result on a scale of 0 to 20, wherein "0" is highly lipophilic. Thus, a numerical result of 10 is considered equally hydrophilic and lipophilic.

Griffin's method is typically used to calculate the HLB of a single molecule or repeat unit in the case of a polymeric material such as a polymeric polyol. When a polymer surfactant comprises a mixture of repeat units, the HLB can be calculated by the summation of the HLBs of the individual repeat units multiplied by the weight fraction of each molecule.

For example, polypropylene glycol having 30 repeat units can have a HLB of 10, whereas the aromatic polyester polyol "PH-56" has an HLB less than 10, i.e. 9.

Aliphatic polyester polyol may also have a HLB less than polypropylene glycol. For example, the aliphatic polyester polyol "Priplast 1900" has an HLB of 8. In other embodiments, the aliphatic polyester polyol may have an HLB less than 7, 6, or 5. For example, the aliphatic polyester polyol "Priplast 1838" has an HLB of 4. In some embodiments, the HLB of the aliphatic polyester polyol is greater than hydrogenated polybutadiene, castor oil, or "Priplast 3196". Thus, the HLB is greater than 2 or 3.

When the polyol component contains a mixture of polyols, the HLB can be determined by summing the HLB of each polyol multiplied by its weight fraction. For example when the polyol component comprises a 1:1 weight ratio of "Priplast 1900" and "Priplast 1838", the HLB of the polyol component is 4.

TABLE A

| Polyol Structure | Solubility Parameters $(cal/cm^3)^{1/2}$ | | | |
| --- | --- | --- | --- | --- |
| | Total | Dispersion | Polar | Hydrogen Bonding |
| Polyester polyol available from Stepan Company under the trade designation "PH-56". | 10.6 | 7.8 | 5.5 | 4.4 |
| Polycaprolactone polyol available from Perstorp UK Ltd. under the trade designation "Capa 2200". | 10.0 | 8.1 | 4.6 | 3.6 |
| Polyester Polyol available from Stepan Company under the trade designation "PC-205P-56". | 10.2 | 8.0 | 4.9 | 3.9 |
| Polyester polyol available from Chemtura Corporation under the trade designation "Fomrez 44-55". | 10.4 | 7.9 | 5.3 | 4.2 |
| Polyester polyol available from Croda under the trade designation "Priplast 1838". | 9.3 | 8.4 | 3.4 | 2.1 |
| Polyester polyol available from Croda under the trade designation "Priplast 1900". | 10.0 | 8.1 | 4.7 | 3.6 |

In some favored embodiments, an aromatic polyester polyol is utilized that can be obtained by reacting an aromatic ortho- or meta-dicarboxylic acid (anhydride) component and an aliphatic diol component. Thus, the polyol component comprises polymerized units of an ortho- or meta-phthalate and comprises polymerized units of an alkylene group comprising at least 4 carbon atoms.

In one embodiment, the polyester polyol (prepared from isophthalic acid or phthalic acid) has the following structure:

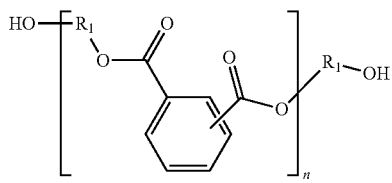

wherein $R_1$ is independently an alkylene group comprising at least 4 carbon atoms,
n is at least 2, 3, 4 or 5, and
the ester group substituents are bonded to the ring at an ortho- or meta-position.

In some embodiments, n is no greater than 25, 20, 15, or 10.

When the aromatic polyester polyol comprises ortho- or meta-ester moieties, the polyester polyol tends to have a low glass transition temperature, e.g. less than 0, 5, or 10° C. Further, such aromatic polyester polyols tend to be (amorphous) viscous liquids at 25° C. In some embodiments, the aromatic polyester polyols have a viscosity of less than 10,000 or 5,000 cP at 80° C.

Aromatic polyester polyols derived from ortho-phthalic acid are commercially available from Stepan under the trade designation Stepanpol™ and have the following structure:

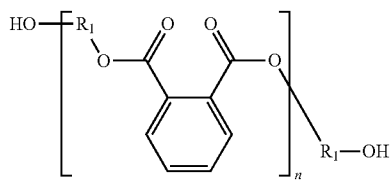

When the aromatic polyester polyol is derived from isoterephthalic acid, the polyester polyol may have the following structure:

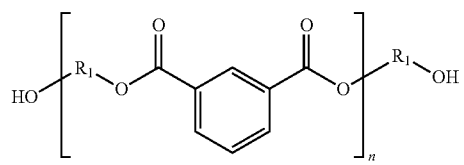

In other embodiments, the polyol may be a (e.g. C36) dimer-based polyester polyol. Such polyol may further comprise a low concentration of aromatic groups, typically less than 1% percent by mass of the polyol.

In some favored embodiments, the aromatic or aliphatic polyester diol(s) depicted above are the primary or sole hydroxyl-functional reactant(s) and sole polyol(s) of the polyurethane. In other embodiments, other polyester and/or polycaprolactone diol(s) having the previously described solubility parameter(s) are the primary or sole hydroxyl-functional reactant and sole polyol of the polyurethane.

Polyols (e.g. diols) having the previously described solubility parameter(s) are the primary polyol of the polyurethane, such polyols are present in an amount of at least 50, 55, 60, 65, 70, 75, 80, 85, 90, 95 or 99 wt.-% of the total amount of polyol components. In some embodiments, aromatic polyester diol(s) are the primary polyol of the polyurethane and are present in an amount of at least 50, 55, 60, 65, 70, 75, 80, 85, 90, 95 or 99 wt.-% of the total amount of polyol components. In other embodiments, aliphatic polyester diol(s) are the primary polyol of the polyurethane and are present in an amount of at least 50, 55, 60, 65, 70, 75, 80, 85, 90, 95 or 99 wt.-% of the total amount of polyol components.

In some embodiments, the hydroxyl number of the (i.e. prior to reacting with the polyisocyanate component) is at least 5, 10, 25, 30, or 40 mg KOH/g and in some embodiments no greater than 200, 150, 100, 90, 80, or 70 mg KOH/g. In some embodiments, the water content of the polyester polyol of other polyol is no greater than 0.10 or 0.05 wt.-% of the polyol. In some embodiments, the Gardner color of the polyester polyol or other polyol is no greater than 3, 2, or 1. In some embodiments, the acid number of the polyester polyol or other polyol is no greater than 5, 4, 3, 2, or 1 mg KOH/g or in other words no greater than 0.005, 0.004, 0.003, 0.002, or 0.001 wt.-% of the polyol. Likewise, in some embodiments the polyurethane polymer also comprises a low concentration of acid, as just described.

The polyol component may further comprise 0.5, 1, 5, 10, 15, 20, 25, 30, 35, 40, 45 or 50 wt.-% of another polyol or other polyols, especially hydrophilic polyols and/or polyols with acid groups. Polyols that function as chain extenders and chemical crosslinkers may also optionally be utilized.

In some embodiments, the polyurethane comprises hydrophilic polymerized units. Such hydrophilic polymerized units may be characterized as having an HLB of at least 12, 13, 14, 15, 16, 17, 18, 19 or 20. A small amount of such hydrophilic groups can improve the environmental aging results, i.e. the adhesive exhibits less than 2, 1.5, or 1% haze after aging at 65° C. add 90% relative humidity for 800 hours. In some embodiments, the polyurethane comprises at least 0.5, 1.0, or 1.5 wt.-% of polymerized hydrophilic units. The amount of polymerized hydrophilic units is typically less than 10, 9, 8, 7, 6, or 5 wt.-% of the total polymerized units of the polyurethane. In some embodiments, the polyurethane comprises no greater than 4, 3.5, or 3 wt.-% of polymerized hydrophilic units.

In some embodiments, the polymerized hydrophilic units is derived from a polyethylene glycol polymer. The polyethylene glycol polymer may be a polyethylene glycol homopolymer or a copolymer of ethylene glycol and a comonomer (e.g. propylene oxide). The copolymer typically comprises at least 50, 60, 70, 80, or 90 wt.-% of polymerized units of ethylene glycol.

One suitable polyethylene glycol polymer is commercially available from Perstorp under the trade designation Ymer™ N-120. The structure of such polymer is as follows:

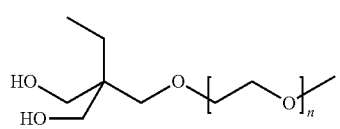

Such material is commonly utilized as a non-ionic dispersing agent for waterborne polyurethane dispersions. However the presently described polyurethane is predominantly hydrophobic and thus does not comprise a sufficient concentration of hydrophilic groups to render the polyurethane water soluble or water dispersible as evidenced by the IPA/water chemical resistance. When the polyethylene glycol polymer has a terminal group comprising two hydroxyl groups, the polymer can be incorporated into the polymer backbone such that the resulting polyurethane comprises pendent polyethylene glycol polymer units. In contrast, polyethylene glycol polymers having a terminal group on both ends result in the polyethylene glycol polymer unit being present in the polymer backbone, rather than being pendent.

Other commercially available ethylene oxide/propylene oxide block copolymers are available from BASF under the trade designation "Pluronic".

In some embodiments, the (e.g. pendent) polymerized hydrophilic units or polyethylene glycol polymer has a molecular weight of at least 200, 300, 400 or 500 g/mole. In some embodiments, the polymerized hydrophilic units or polyethylene glycol polymer has a molecular weight no greater than 2000 or 1500 g/mole.

In some embodiments, a compound comprising one or more hydroxy groups and one or more ethylenically unsaturated groups is utilized during the preparation of the polyurethane. The hydroxyl group reacts with the polyisocyanate incorporating ethylenically unsaturated groups into the polyurethane. In some embodiments, compound having a single hydroxyl group and a single ethylenically unsaturated group can be utilized such as hydroxyethyl acrylate (HEA). In this embodiment, an isocyanate group is bonded to the polyurethane polymer backbone and the opposing end of the diisocyanate is bonded to the hydroxyl group of the compound resulting in a terminal ethylenically unsaturated group. In other embodiments, the compound has at least two hydroxy groups ad at least two ethylenically unsaturated groups, such as bisphenol A glycerolate dimethacrylate (BAGDM). In this embodiment, the compound functions as a polyol (i.e. diol) and is thereby incorporated into the polyurethane backbone. The ethylenically unsaturated groups are pendent with respect to the polyurethane backbone.

Various compounds comprising one or more hydroxy groups and one or more ethylenically unsaturated groups can be utilized during the preparation of the polyurethane. Such compound can be aliphatic or aromatic. Other representative compounds available from Nagase ChemteX Corporation, Osaka, Japan include for example epoxy acrylate form 1,6 hexane diol, available as DA-212; epoxy acrylate form 1,4 hexane diol, available as DA-214L.

The polyisocyanate component may comprise various polyfunctional isocyanate compounds. Examples of such polyfunctional isocyanate compound include polyfunctional aliphatic isocyanate compounds, polyfunctional aliphatic cyclic isocyanate compounds, and a polyfunctional aromatic isocyanate compounds.

Examples of the polyfunctional aliphatic isocyanate compounds include trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate, and 2,4,4-trimethylhexamethylene diisocyanate.

Examples of the polyfunctional aliphatic cyclic isocyanate compounds include 1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, hydrogenated tetramethylxylene diisocyanate, and bio-based polyfunctional aliphatic cyclic isocyanates, such as 2-heptyl-3,4-bis(9-isocyanatononyl)-1-pentylcyclohexane from BASF Corporation under tradename DDI®1410.

Examples of the polyfunctional aromatic isocyanate compounds include phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate, and xylylene diisocyanate.

In some embodiments, the polyfunctional isocyanate comprises a polyisocyanate that is a liquid at 25° C. alone or in combination with minor amount of a polyisocyanate that is a solid at 25° C. In other embodiments, such as when the polyol is an aliphatic polyol, the polyfunctional isocyanate is a solid at 25° C.

In some embodiments, the polyfunctional isocyanate compound comprises an aliphatic isocyanate compound, such as hexamethylene diisocyanate. In other embodiments, the polyfunctional isocyanate compound comprises a ortho- or meta-aromatic isocyanate compound, such as 1,4 methylene diphenyl diisocyanate (MDI), m-tetramethylene diisocyanate (TMXDI), or mixtures thereof. Mixtures of (e.g. cyclic) aliphatic and aromatic polyfunctional isocyanate compounds may also be utilized.

In some embodiments, aliphatic polyester polyols or aliphatic polyester polyols can be utilized with an aromatic or cyclic aliphatic polyisocyanate.

In some embodiments the polyurethane adhesive composition comprises the reaction product of the above-described polyisocyanate and polyol components, and also a functional acid containing compound represented by the formula: (HX)2 R1 A; wherein A is a functional acid group selected from —CO2 M, —OSO3 M, —SO3 M, —OPO (OM)2, —PO(OM)2, wherein M is H or a cation such as sodium, potassium, and calcium; X is O, S, NH or NR wherein R is an alkylene group comprising 1 to 10 or 1 to 4 carbon atoms; and R1 is an organic linking group having a valency of at least 3, comprising 1 to 50, 1 to 30, 1 to 15, or 1 to 7 carbon atoms, and optionally includes one or more tertiary nitrogen, ether oxygen, or ester oxygen atoms, and is free from isocyanate-reactive hydrogen containing groups. In some embodiments, A is —$CO_2$ M, X is O or NH, and $R^1$ is a linear or branched alkylene having from 1 to 7 carbon atoms. Illustrative functional acid containing compounds include dihydroxycarboxylic acids, dihydroxysulphonic acids, dihydroxyphosphonic acids and salts thereof such as dimethylolpropionic acid (DMPA) depicted as follows (or its derivatives from GEO Specialty Chemicals, Inc. under tradename such as DMPA® Polyol HA-0135, DMPA® Polyol HA-0135LV2, DMPA® Polyol HC-0123 and DMPA® Polyol BA-0132):

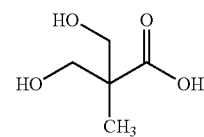

In some embodiments, the amount of functional acid in the polyurethane may be described in terms of the number of millimoles of the functional acid group A (mmol A) per 100 grams of the polyurethane (100 g PU). In this regard, the polyurethane may include between 0.001 and 37 mmol A/100 g PU, 0.1 and 37 mmol A/100 g PU, 1 and 37 mmol A/100 g PU, or between 1 and 25 mmol A/100 g PU. It is believed that the incorporation of a small amount of acid functional groups in the polyurethane may further improve (relative to the polyurethanes of the present disclosure without acid functional groups) adhesion properties as well as the chemical resistance of the material to, for example, polar chemicals.

In some embodiments, the polyurethane comprises at least 25, 30, 35, 40, or 45 mol % of alkylene groups comprising at least 4, 5 or 6 carbon atoms. In some embodiments, the polyurethane comprises no greater than 65 or 60 mol % of alkylene groups comprising at least 4, 5, or 6 carbon atoms, some of which are provided by use of a polyisocyanate comprising a long chain alkylene group such as hexanediisocyanate or isophorone diisocyante. In other embodiments, such as when the polyisocyanate component is primarily or solely aromatic polyisocyanate(s) the polyurethane comprises no greater than about 55 or 50 mol % of alkylene groups comprising at least 4, 5, or 6 carbon atoms. The alkylene groups typically have no greater than 36, 24, 12, or 8 carbon atoms as previously described. The polyurethane is obtained by reacting a polyol component comprising the aromatic polyester polyol and/or other polyol have the solubility parameter(s) previously described and at least one polyfunctional isocyanate compound. Such composition may optionally comprise other components that do not detract from the desired heat resistance and/or chemical resistance of the polyurethane.

In some embodiments, the aromatic polyester polyol is reacted with an isocyanate component such that the ratio of hydroxyl equivalents (OH groups) with respect to the NCO isocyanate equivalents (NCO groups) is about 1:1. The hydroxyl content of the resulting polyurethane is no greater than about 0.5 wt.-%.

In other embodiments, the polyurethane polymers can be prepared by the reaction of a stoichiometric excess of organic polyisocyanate. The molar ratio of NCO to OH is typically about 1.3 to 1 or 1.2 to 1 or 1.1 to 1

In this embodiment, the NCO terminal groups are typically further reacted with a multi-functional polyol. Suitable multi-functional polyols may include two or more hydroxyl groups such as, for example, branched adipate glycols, trimethylolpropane, 1,2,6-hexanetriol, trimethylolethane, pentaerythritol, dipentaerythritol, tripentaerythritol and the like.

In other embodiments, the polyurethane polymers can be prepared by the reaction of a stoichiometric excess of polyol. The molar ratio of OH to NCO is typically about 1.3 to 1 or 1.2 to 1 or 1.1 to 1.

In this embodiment, the OH terminal groups are typically further reacted with a multi-functional polyisocyanate. Suitable multi-functional polyisocyanates may include two or more isocyanate groups such as, for example, Desmodur N-3300, Desmodur N-3390 and Desmodur N-3400 from Bayer.

In addition to urethane linkages, polyurethane can contain additional groups as known in the art, provided that such additional groups do not detract from the desired heat and/or chemical resistance. In typical embodiments, the polyurethane does not contain (terminal) silyl groups.

When reacting the polyol component(s) with the isocyanate component(s), the reaction temperature is typically in the range of from about 60° C. to about 90° C. depending on the selection of respective reactants and selection of catalyst. The reaction time typically ranges from about 2 to about 48 hours.

The polyurethane compositions are typically prepared with a catalyst as known in the art. The amount of catalyst can range up to about 0.5 parts by weight of the polyurethane. In some embodiments, the amount of catalyst ranges from about 0.001 to about 0.05 wt.-% of the polyurethane. Examples of useful catalysts include but are not limited to those selected from the group consisting of tin II and IV salts such as stannous octoate and dibutyltin dilaurate, and dibutyltin diacetate; tertiary amine compounds such as triethyl amine and bis(dimethylaminoethyl) ether, morpholine compounds such as beta, beta'-dimorpholinodiethyl ether, bismuth carboxylates, zinc-bismuth carboxylates, iron (III) chloride, potassium octoate, and potassium acetate.

Solvents can be utilized to control the viscosity of the polyurethane. Examples of useful solvents (which are typically volatile organic compounds) added for this purpose include but are not limited ketones (e.g. methyl ethyl ketone, acetone), tertiary alcohols, ethers, esters (e.g. ethyl acetate), amides, hydrocarbons, chlorohydrocarbons, chlorocarbons, and mixtures thereof.

The resulting polyurethane typically has a molecular weight (Mw) of at least 50,000 g/mole as determined by the test method described in the examples. The molecular weight (Mw) of the polyurethane is typically no greater than 500,000 g/mole, 300,000 g/mole, or in some embodiments no greater than 275,000 g/mole or 250,000 g/mole.

In some embodiments the polyurethane has a molecular weight (Mw) of between 30,000 and 500,000 g/mole, 50,000-300,000 g/mole, or 75,000-200,000 g/mole. After crosslinking of the ethylenically unsaturated groups of the polyurethane, the molecular weight (Mw) can be even higher and can exhibit better chemical resistance. In some embodiments, the polyurethane adhesives of the present disclosure may optionally include a chemical crosslinking agent. Generally, any suitable chemical crosslinking agent may be used. Exemplary chemical crosslinking agents include covalent crosslinkers such as bisamides, epoxies (for example, N,N,N',-tetraglycidiyl-m-xylenediamine, available from Mitsubishi Gas Chemical Co. Inc, Japan, as the trade designation "TETRAD-X"), melamines, multi-functional amines and aziridines (for example, propylene imine tri-functional polyaziridine, available from PolyAziridine, LLC, Medford, N.J., as the trade designation "PZ-28"; and ionic crosslinking agents such as metal oxides and organometallic chelating agents (e.g., aluminum acetylacetonate).

When the polyurethane is prepared from a functional acid containing compound and thereby further comprises acidic groups, the polyurethane adhesive may further comprise a carbodiimide (e.g. polycarbodiimide) crosslinker such as commercially available from Stahl, USA, Calhoun, Ga. Such carbodiimide crosslinkers as well as other acid-reactive compounds can also function as an acid scavenger even in the absence of the polyurethane comprising acidic groups. These reactions involve the addition of a (e.g. carboxylic) acid group across the carbodiimide to form a urea linkage. Other chemical crosslinkers described above may also function as an acid scavenger. In some embodiments, the adhesive composition further comprises at least 0.1, 0.2, 0.3, 0.4, or 0.5 wt.-% of a carbodiimide and/or other acid-reactive compound. The concentration of carbodiimide and/or other acid-reactive compound is typically no greater than 5, 4, 3, or 2 wt.-% of the adhesive composition.

The polyurethane polymers are preferably stable at high temperature and high humidity conditions. However, polyurethane polymers are susceptible to chemical breakdown due to reaction with water. The hydrolysis of the polyurethane polymer can generate alcohols and acids. Acid can further catalysis the hydrolysis process to accelerate the chemical breakdown process. The inclusion of acid-reactive compounds, especially carbodiimide (e.g. polycarbodiimide) and epoxy compounds can reduce such chemical breakdown. In this embodiment, these materials may be characterized as acid traps. The acid traps not only reduce the acid, but also can re-crosslink those acid groups generated during hydrolysis.

When the polyurethane further comprises ethylenically unsaturated (e.g. (meth)acrylate) groups as described above, the polyurethane adhesive may further comprise a multi-(meth)acrylate crosslinker, such as urethane (meth)acrylate oligomers. Urethane (meth)acrylate oligomers may be obtained commercially; e.g., from Sartomer under the trade "CN 900 Series". Oligomeric urethane (meth)acrylates may also be prepared by the initial reaction of an alkylene or aromatic diisocyanate of the formula OCN—R—NCO with a polyol. Most often, the polyol is a diol of the formula HO—R$_4$—OH, wherein R$_3$ is a C$_{2-100}$ alkylene or an arylene group and R$_4$ is a C$_{2-100}$ alkylene or alkoxy group. The intermediate product is then a urethane diol diisocyanate, which subsequently can undergo reaction with a hydroxyalkyl (meth)acrylate. Suitable diisocyanates include alkylene diisocyanates such as 2,2,4-trimethylhexylene diisocyanate. The physical properties of various urethane (meth)acrylate oligomers, as reported by the supplier, are set forth as follows:

| Trade Designation | Viscosity, cps at 60° C. | Tensile Strength, psi | Elongation, % | Tg, ° C. |
|---|---|---|---|---|
| CN983 | 5150 | 8400 | 4 | 92 |
| CN9782 | 42,000 | 1100 | 365 | −32 |
| CN9178 | 2,000 | 160 | 61 | −7 |
| CN9031 | 20,000 | 200 | 270 | −3 |
| CN966 | 4,240 | 430 | 238 | −33 |

The reported tensile strength, elongation, and glass transition temperature (Tg) properties are based on a homopolymer prepared from such urethane (meth)acrylate oligomer. In some embodiments, the urethane (meth)acrylate oligomer has a Tg below room temperature (25° C.). In some embodiments, the Tg of the urethane (meth)acrylate oligomer is less than 0, −5 or −10° C. The Tg is typically at least −50° C. When the urethane (meth)acrylate oligomer has a Tg below room temperature (25° C.), the peel adhesion at high temperature can be maintained after crosslinking. In some embodiments, the tensile strength of the urethane (meth)acrylate oligomer is less than 5,000; 4,000; 3,000, or 2,000 psi. The tensile strength is typically at least 50, 100, or 150 psi. In some embodiments, the elongation of the urethane (meth)acrylate oligomer is at least 25 or 50% and typically no greater than 500 or 400%. In some embodiments, the viscosity of the urethane (meth)acrylate oligomer can be low, ranging from 1000 to 5,000 cps at 60° C. In other embodiments, the viscosity of the urethane (meth)acrylate oligomer can be moderate, ranging from greater than 5,000 to 25,000 cps at 60° C. In yet other embodiments, the viscosity of the urethane (meth)acrylate oligomer can be greater than 25,000 cps at 60° C. ranging up to 50,000; 60,000; 70,000 or 80,000 cps. In some embodiments, a combination of two or more urethane (meth)acrylate oligomers are utilized. In one embodiment, the first urethane (meth)acrylate oligomer has a Tg below 25° C. as previously described and the second urethane (meth)acrylate oligomer as a higher Tg (e.g. at least 50 or 75° C. ranging up to 100° C. or greater). In some embodiments, the urethane (meth)acrylate oligomer is preferably aliphatic.

In some embodiments, the multi-(meth)acrylate crosslinker may be characterized as a hydrophilic crosslinker. Inclusion of a hydrophilic multi-(meth)acrylate crosslinker can provide good chemical resistance (e.g. rating "5") under more severe test conditions, such as illustrated by forthcoming Examples 13 and 14. In some embodiments, the hydrophilic crosslinker may have an HLB greater than 12. Such crosslinkers typically comprise two or three (meth)acrylate groups and alkylene oxide repeat units. The alkylene repeat unit typically have the formula -[L-O]n- wherein L is a linear or branched alkylene. The multi-(meth)acrylate crosslinker generally comprises at least three or four contiguous alkylene oxide repeat units. In some embodiments, the multi-(meth)acrylate crosslinker comprises at least 5, 6, 7, 8, 9, or 10 contiguous alkylene oxide repeat units. In some embodiments, the number of contiguous alkylene oxide repeat units is no greater than 30, or 25, or 20, or 15.

In some embodiments, the crosslinker comprises solely ethylene oxide repeat units. In other embodiments, the crosslinker comprises solely propylene oxide repeat units. In yet other embodiments, the crosslinker comprises solely butylene oxide repeat units. In yet other embodiments, the crosslinker may comprise various combinations of such alkylene oxide repeat units. For example, the multi-(meth)acrylate crosslinker may comprise a combination of both ethylene oxide and propylene oxide repeat units.

In some embodiments, the multi-(meth)acrylate crosslinker may be aliphatic and represented by the general formulas:

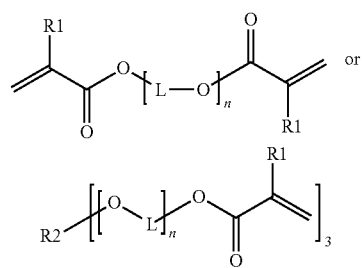

wherein R1 is H or methyl, R2 is a trivalent organic residue, L is independently a straight-chain or branched C$_2$ to C$_6$ alkylene, and n is 3 to 30.

In some embodiments, R2 is a hydrocarbon residue comprising at least 3, 4, 5, or 6 carbon atoms and typically no greater than 12 carbon atoms. In some embodiments, R is a hydrocarbon residue, optionally further comprising one or more oxygen, sulfur or nitrogen atoms.

Polyethylene and polypropylene glycol diacrylates typically comprise a mixture of molecules wherein n averages the range specified above.

In some embodiments, a tri(meth)acrylate monomer is utilized comprising 4 to 5 contiguous alkylene oxide repeat units, such as ethylene oxide repeat units, propylene oxide repeat units, or a mixture thereof. The number of contiguous alkylene oxide repeat units may be no greater than 15, or 14, or 13, and in some embodiments, no greater than 12, or 9, or 10. A representative monomer includes ethoxylated trimethylol propane tri(meth)acrylate monomers, the acrylate having the following formula:

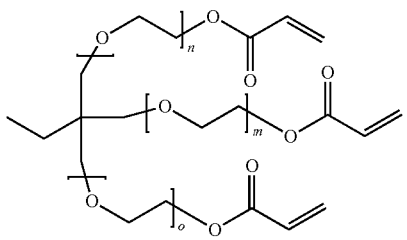

wherein at least one of n, m or o is 3 or 4. The sum of n+m+o is typically at least 5, 6, 7, 8, 9, or 10 and in some embodiments no greater than 30.

One representative monomer of such formula, wherein the sum of n, m and o is about 15, is available from Sartomer under the trade designation "SR9035". Another representative monomer of such formula, wherein the sum of n, m and o is about 20, is available from Sartomer under the trade designation "SR415".

In other embodiments, the multi-(meth)acrylate crosslinker may be characterized as aromatic. such as in the case of ethoxylated bisphenol diacrylate crosslinkers.

Various commercially available multi-(meth)acrylate crosslinkers are described in the following table.

| Trade Designation | Moles of ethoxylation | Viscosity, cps at 25° C. | Functionality |
|---|---|---|---|
| SR502 ethoxylated trimethylol propane | 9 | 130 | 3 |
| SR499 ethoxylated trimethylol propane | 6 | 80 | 3 |
| SR9038 | 30 | 680 | 2 |
| SR602 ethoxylated bisphenol | 10 | 610 | 2 |

The amount of crosslinking agent included depends on well-understood factors such as the desired degree of crosslinking and the relative effectiveness of the crosslinking agent in the particular system. Crosslinking of the polyurethane using chemical crosslinking, agents may be initiated using any conventional technique, such as thermal initiation. In some embodiments, polyurethane adhesives of the present disclosure ma include from 0.1 to 5 wt. % or 0.1 to 1 wt. % of a bisamide crosslinker based on the total weight of the polyurethane. Alternatively, or additionally, in some embodiments, the polyurethane adhesives of the present disclosure may 0.1 to 5 wt. % or 0.1 to 2 wt. % of aluminum acetylacetonate crosslinker based on the total weight of the polyurethane. It is believed that the addition of a chemical crosslinking agent may further enhances the shear and cohesive strength of the adhesive, as well as the chemical and high temperature creep resistance.

As an alternative to, or in addition to chemical crosslinking, the polyurethanes of the present disclosure further comprising ethylenically unsaturated groups and/or a multi-(meth)acrylate crosslinker may be crosslinked by subjecting the polyurethanes to gamma, electron beam, or ultraviolet radiation (with or without a photoinitiator) radiation. In this embodiment, the polyurethane may be free of chemical crosslinking agents (or residues thereof).

In some embodiments, polyurethane adhesives described herein comprise from 0.1 to 2, 3, 4, 5, 6, 7, 8, 9, or 10 wt. % of multi-(meth)acrylate crosslinker(s) such as urethane (meth)acrylate oligomer(s) and/or the hydrophilic multi-functional (meth)acrylate monomers described above.

Crosslinking can increase the gel content (as determined according to the test method described in the examples) of the polyurethane adhesive. For example in the absence of (e.g. multi-(meth)acrylate) crosslinker, the gel content may range from 5 to 10%. However, when (e.g. multi-(meth)acrylate crosslinker(s)) is present, the gel content is typically greater than 10, 15, 20, 25, 30, 35, 40, 45, or 50% ranging up to 60 or 70%.

In some embodiments, the pressure sensitive adhesive comprises the polyurethane polymer described herein dissolved in a non-aqueous organic solvent. The organic solvent content typically ranges from about 2 wt. % to 98 wt. %. By non-aqueous, it is meant that the liquid medium contains less than 3, 2, or 1 wt. % water.

In addition to the polyurethane, the pressure sensitive adhesive composition may optionally include one or more additives such as (e.g. inorganic oxide) fillers such as (e.g. fumed) silica and glass bubbles, tackifiers, adhesion promoters, plasticizers, (e.g. chemical) foaming agents, thixotropic agents, ultraviolet stabilizers, antioxidants, antistatic agents, colorants, impact resistance aids, flame retardants (e.g. zinc borate), and the like.

In some embodiments, the pressure sensitive adhesive composition comprises tackifiers and/or plasticizers to adjust the adhesion. In this embodiment, the total amount of tackifier and/or plasticizer of the adhesive composition is typically no greater than 50, 40, 30, 20, 15, 10, or 5 wt.-% solids of the total adhesive composition. In other embodiments, the pressure sensitive adhesive composition comprises little of no (i.e. zero) tackifiers and/or plasticizers. In this embodiment, the adhesive composition comprises no greater than 4, 3, 2, 1, 0.5, 0.1, or 0.05 wt-% of tackifer and/or plasticizer.

When the adhesive composition comprises little or no tackifer and/or plasticizer, the pressure sensitive adhesive properties (e.g. tack, peel adhesion) are generally contributed by the $R_1$ group of the polyurethane (e.g. aromatic or aliphatic polyester or polycarbonate polyol). Without intending to be bound by theory, the tack and peel adhesion can be increased by use of a longer branched alkylene group and/or by reducing the crosslinking. Conversely, the tack and peel adhesion can be decreased by use of a shorter branched alkylene group or by increasing the crosslinking. The adhesion can also be adjusted by the addition of other aliphatic polyols having longer or shorter alkylene groups.

When it is desired for the pressure sensitive adhesive composition to be transparent, the adhesive is typically free of fillers having a particle size greater than 100 nm that can detract from the transparency of the adhesive composition. In this embodiment, the total amount of filler of the adhesive composition is no greater than 10, 9, 8, 7, 6, 5, 4, 3, or 2 wt-% solids of the adhesive composition. In some favored embodiments, the adhesive composition comprises no greater than 1, 0.5, 0.1, or 0.05 wt-% of filler.

However, in other embodiments, the pressure sensitive adhesive may comprise higher amounts of inorganic oxide filler such as fumed silica.

In some embodiments, the pressure sensitive adhesive comprises colorants such as pigments and dyes including titania and carbon black. The concentration of such pigments and dyes can range up to about 20 wt-% of the total composition.

The inclusion of inorganic oxides such as (e.g. fumed) silica and titania can increase the tensile strength of the adhesive composition.

A laminating tape can be formed by coating the polyurethane compositions on a backing or release liner using conventional coating techniques. For example, these compositions can be applied by methods such as roller coating, flow coating, dip coating, spin coating, spray coating knife coating, and die coating. Coating thicknesses may vary. The composition may be of any desirable concentration for subsequent coating, but is typically at least 20 or 25 wt-% polyurethane polymer solids in an organic solvent. In some embodiments, the coating comprises to greater than about 60 wt-% solids polyurethane. The desired concentration may be achieved by further dilution of the coating composition, or by partial drying. The coating thickness may vary depending on the desired thickness of the pressure sensitive adhesive layer.

The thickness of the pressure sensitive adhesive layer is typically at least 10, 15, 20, or 25 microns (1 mil) ranging up to 500 microns (20 mils) thickness. In some embodiments, the thickness of the pressure sensitive adhesive layer is no greater than 400, 300, 200, or 100 microns. The pressure sensitive adhesive can be coated in single or multiple layers.

The pressure sensitive adhesive composition may be coated upon a variety of flexible and inflexible backing materials using conventional coating techniques to produce a single coated or double coated pressure sensitive adhesive tape. The tape may further comprise a release material or release liner. For example, in the case of a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, second layer of adhesive is disposed on the opposing surface of the backing surface. The second layer may also comprises the polyurethane pressure sensitive adhesive as described herein or a different adhesive composition.

Flexible substrates are defined herein as any material which is conventionally utilized as a tape backing or may be of any other flexible material. Examples include, but are not limited to polymeric films, woven or nonwoven fabrics; metal foils, foams (e.g., polyacrylic, polyethylene, polyurethane, neoprene), and combinations thereof (e.g. metalized polymeric film). Polymeric film include for example polypropylene (e.g. biaxially oriented), polyethylene (e.g. high density or low density), polyvinyl chloride, polyurethane, polyester (polyethylene terephthalate), polycarbonate, polymethyl(meth)acrylate (PMMA), polyvinylbutyral, polyimide, polyamide, fluoropolymer, cellulose acetate, cellulose triacetate, and ethyl cellulose. The woven or nonwoven fabric may comprise fibers or filaments of synthetic or natural materials such as cellulose (e.g. tissue), cotton, nylon, rayon, glass, ceramic materials, and the like.

A substrate may be bonded by the pressure sensitive adhesive or laminating tape described herein. The substrate may comprise the same materials as just described for the backing.

One method of bonding comprises providing a first substrate and contacting a surface of the first substrate with the pressure sensitive adhesive (e.g. laminating tape or protective film). In this embodiment, the opposing surface of the pressure sensitive adhesive is typically temporarily covered by a release liner.

In other embodiments, the method further comprises contacting the opposing surface of the pressure sensitive adhesive to a second substrate. The first and second substrate may be comprised of various materials as previously described such as metal, an inorganic material, an organic polymeric material, or a combination thereof.

In some methods of bonding, the substrate, pressure sensitive adhesive, or combination thereof may be heated to reduce the storage modulus (G') and thereby increase the (e.g. peel) adhesion. The substrate and/or pressure sensitive adhesive may be heated to a temperature up to 30, or 35, or 40, or 45, or 50, or 55, or 60, or 65 or 70° C. In some embodiments, the substrate(s) together with the adhesive bonded to the substrate(s) by means of the initial peel adhesion at ambient temperature (e.g. 25° C.) is heat in an oven to the desired temperature. In other embodiments, the substrate and/or pressures sensitive adhesive is heat by means of a hot air gun.

When the polyurethane further comprises ethylenically unsaturated groups, the ethylenically unsaturated groups may be polymerized (e.g. by radiation curing), crosslinking the ethylenically unsaturated of the polyurethane or crosslinker. This can occur prior to contacting the opposing surface of the pressure sensitive adhesive to a second substrate and/or after contacting the opposing surface of the pressure sensitive adhesive to a second substrate.

When the pressure sensitive adhesive further comprises uncrosslinked ethylenically unsaturated groups that are polymerized (e.g. by radiation curing) during use; the pressure sensitive adhesive, laminating tape, or protective film is generally packaged in an opaque (e.g. black) container to prevent premature crosslinking that can be caused by exposure to (e.g. visible) light.

The transparent adhesive composition described herein may also be disposed on a transparent film for use as a removable or permanent surface protection film. In some embodiments, the pressure sensitive adhesive and transparent film having a transmission of visible light of at least 90 percent.

The pressure sensitive adhesive, laminating tapes, and protective films described herein are suitable for use in the areas of electronics, appliances, automotive, and general industrial products. In some embodiments, the pressure sensitive adhesive and laminating tapes can be utilized in (e.g. illuminated) displays that can be incorporated into household appliances, automobiles, computers (e.g. tablets), and various hand-held devices (e.g. phones).

The presently disclosed adhesive composition can be laminated to solid substrates at ambient temperature (25° C.) and provide good high temperature/humidity stability and chemical resistance. The superior oil (e.g. oleic acid) and alcohol resistance of the presently disclosed adhesive composition makes it attractive for various applications including automotive, aerospace, electronics and appliance markets where maintaining adhesive bond strength under high temperature/humidity and chemical environment are of importance.

In some embodiments, the pressure sensitive adhesive and laminating tapes described herein are suitable for bonding internal components or external components of an illuminated display devices such as liquid crystal displays ("LCDs") and light emitting diode ("LEDs") displays such as cell phones (including Smart phones), wearable (e.g. wrist) devices, car navigation systems, global positioning systems, depth finders, computer monitors, notebook and tablet computer displays.

In some embodiments, the pressure sensitive adhesive or laminating tape may exhibit a low level of adhesion to (e.g. float) glass or stainless steel. For example, the room temperature 180° peel values can be at least 0.5, 1, 2, 3, 4, 5, 10, or 15 N/dm ranging up to 20 N/dm at a 300 mm/minute peel rate after a 72 hour dwell time at 65° C. and 90% relative humidity (as further described in the test method in the examples). In other embodiments, the 180° peel values of the pressure sensitive adhesive or laminating tape (e.g. heat bondable) can be higher, for example at least 25, 50, 75, 100, 125 N/dm ranging up to 220 N/dm.

In some embodiments, the pressure sensitive adhesive or laminating tape may exhibit the same of higher level of adhesion to glass or stainless steel after exposure to elevated temperatures and humidity, such as after a 72 hour dwell time at 65° C. and 90% relative humidity. In some embodiments, the increase in adhesion is no greater than 300%, 250%, 200%, 150%, 100%, 90%, 80%, or 70% (as determine by subtracting the 24 hr room temperature value from the aged peel value, dividing by the 24 hr room temperature value and multiplying by 100%. In other embodiments, the pressure sensitive adhesive or laminating tape may exhibit a lower level of adhesion to glass or stainless steel after exposure to elevated temperatures and humidity, such as after a 72 hour dwell time at 85° C. and 90% relative humidity.

In some embodiments, the pressure sensitive adhesive or laminating tape does not dissolve in oleic acid and/or a 70% isopropyl alcohol aqueous solution after 72 hours at 70° C.

In some embodiments, the pressure sensitive adhesive composition has a storage modulus G' as can be measured by Dynamic Mechanical Analysis (as further described in the examples) of less than 1, 0.9, 0.8, 0.7, 0.6 or 0.5 MPa at 25° C. and a frequency of 1 hertz. The storage modulus decreases with increasing temperature. In some embodiments, the pressure sensitive adhesive composition has a storage modulus G' of less than 0.6 or 0.5 at 35° C. and a frequency of 1 hertz. In some embodiments, the pressure sensitive adhesive composition has a storage modulus G' of less than 0.5 or 0.4 at 45° C. and a frequency of 1 hertz. In some embodiments, the pressure sensitive adhesive composition has a storage modulus G' of less than 0.4 or 0.3 at 55° C. and a frequency of 1 hertz. In some embodiments, the pressure sensitive adhesive composition has a storage modulus G' of less than 0.3 or 0.2 at 65° C. and a frequency of 1 hertz. The pressure sensitive adhesive has a storage modulus G' of less than 0.3 at frequency of 1 hertz at a temperature less than 70, or 65, or 60, or 55, or 50, or 45° C.

The pressure sensitive adhesive has a glass transition temperature of less 25° C. as can be measured by Dynamic Mechanical Analysis. In some embodiments, the glass transition temperature is less than 20° C. or 15° C. In some embodiments, the glass transition temperature is above 0° C. In some embodiments, the glass transition temperature is less than 0° C., −10° C., −20° C., −30° C. or −40° C.

In some embodiments, the polyurethanes of the present disclosure may be utilized as a primer. In these embodiments, the polyurethane is formed into a dilute solution (e.g. 2 to 20 wt-% solids) in an organic solvent (e.g. MEK) or solvent mixture. The solution is applied to a substrate and dried. A pressure sensitive adhesive may then applied to the dried primer. The pressure sensitive adhesive may be a polyurethane pressure sensitive adhesive as described herein. Alternatively the pressure sensitive adhesive may be a different pressure sensitive adhesive, such as a different polyurethane or different acrylic adhesive. Polyurethanes of the present disclosure that are the reaction product of the above-described polyisocyanate, polyol, and functional acid containing compounds may be particularly suited for use as primers.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, hr=hour, kg=kilograms, min=minutes, mol=mole; cm=centimeter, mm=millimeter, mL=milliliter, L=liter, MPa=megaPascals, and wt=weight.

Materials

| Designation | Description, Source |
|---|---|
| PH-56 | Polyester Polyol Mw = 2000, obtained under trade designation "STEPANPOL PH-56" from Stepan Company, Northfield, IL |
| DESMODUR H | Hexamethylene diisocyanate, obtained under the trade name "DESMODUR H" from Covestro, Pittsburgh, PA |
| MONDUR MLQ | Monomeric diphenylmethane diisocyanate, obtained under the trade name "MONDUR MLQ" from Covestro, Pittsburgh, PA |
| MEK | Methyl ethyl ketone, solvent obtained from Avantor Performance Materials, Inc., Center Valley, PA |
| DBTDA | Dibutyltin diacetate catalyst obtained from Sigma-Aldrich Chemical Co., St. Louis, MO |
| DMPA ® Polyol HA-0135 LV2 | Acid containing polyol, obtained from GMO Specialty Chemicals, Ambler, PA |
| DMPA | Dimethylolpropionic acid, obtained from GMO Specialty Chemicals, Ambler, PA |
| YMER N120 | PEG-modified diol obtained under trade designation "YMER N120" from Perstorp, Malmo, Sweeden |
| PRIPLAST 1838 | C36 dimer-based polyester polyol, amorphous, Mn of 2000, obtained under trade designation "PRIPLAST 1838" from Croda Inc, Edison, NJ |
| PRIPLAST 1900 | C36 dimer-based polyester polyol, amorphous, Mn of 2000, obtained under trade designation "PRIPLAST 1900" from Croda Inc, Edison, NJ |
| PRIPLAST 1901 | C36 dimer-based polyester polyol, amorphous, Mn of 2000, obtained under trade designation "PRIPLAST 1901" from Croda Inc, Edison, NJ. |
| PRIPLAST 3180 | C36 dimer-based polyester polyol, amorphous, Mn of 2000, obtained under trade designation "PRIPLAST 3180" from Croda Inc, Edison, NJ. PRIPLAST 3180 is the low color version of PRIPLAST 1900. |
| DESMODUR W | Monomeric cycloaliphatic diisocyanate, obtained under the trade name "DESMODUR W" from Covestro, Pittsburgh, PA |

-continued

| Designation | Description, Source |
|---|---|
| DESMODUR I | Monomeric cycloaliphatic diisocyanate, obtained under the trade name "DESMODUR I" from Covestro, Pittsburgh, PA |
| TMXDI | META-Tetramethylxylylene diisocyanate, obtained under the trade name "TMXDI" from Allnex Inc, Brussels, Belgium |
| BAGDM | Bisphenol A glycerolate dimethacrylate, obtained from Sigma-Aldrich Chemical Co., St. Louis, MO |
| K-KAT XC-B221 | Bismuth catalyst, obtained under trade designation "K-KAT XC-B221" from King Industries, Norwalk, CT |
| IRGACURE 184 | Phosphine oxide, phenyl bis (2,4,6-trimethyl benzoyl), obtained under trade designation "IRGACURE 184" from BASF America, Florham Park, NJ |
| KBM-403 | Glycidoxypropyl trimethoxysilane, obtained under trade designation "KBM-403" from Shin-Etsu Silicones of America, Inc, Akron, OH |
| Irgacure ® TPO-L | 2,4,6-trimethylbenzoylphenyl phosphinate, obtained under trade designation "Irgacure ®TPO-L" from BASF America, Florham Park, NJ |
| SR415 | 20 mole ethoxylated trimethylolpropane triacrylate from Sartomer, Exton, PA |
| CN983 | an aliphatic polyester based urethane diacrylate oligomer from Sartomer, Exton, PA |
| CN9782 | a difunctional aromatic urethane acrylate oligomer from Sartomer, Exton, PA |
| NTX12514 | A difunctional aliphatic urethane acrylate oligomer from Sartomer, Exton, PA |
| CN9178 | a difunctional aliphatic urethane acrylate oligomer from Sartomer, Exton, PA |
| A-174 | 3-(methacryloyloxy)prpyltrimethoxysilane from Alfa Aesar, Ward Hill, MA |
| XR-5580 | Polycarbodiimide compound, obtained under trade designation "Permutex ®XR-5580" from Stahl USA, Peabody, MA |
| J9 | Silicone coated polyester release liner, obtained from Nippa Corp., Osaka, Japan |
| RF02N | Silicone coated polyester release liner, obtained from SKC Haas Display Films Co. Ltd., Cheonan, South Korea |
| RF52N | Silicone coated polyester release liner, obtained from SKC Haas Display Films Co. Ltd., Cheonan, South Korea |

Test Methods

Method for Determining Polyurethane Molecular Weight

The molecular weight distribution of the compounds was characterized using gel permeation chromatography (GPC). The GPC instrumentation, which was obtained from Waters Corporation (Milford, Mass., USA), included a high pressure liquid chromatography pump (Model 1515HPLC), an auto-sampler (Model 717), a UV detector (Model 2487), and a refractive index detector (Model 2410). The chromatograph was equipped with two 5 micrometer PL gel MIXED-D columns available from Varian Inc. (Palo Alto, Calif., USA). Samples of polymeric solutions were prepared by dissolving dried polymer samples in tetrahydrofuran at a concentration of 1.0 percent (weight/volume) and filtering through a 0.2 micrometer polytetrafluoroethylene filter that is available from VWR International (West Chester, Pa., USA). The resulting samples were injected into the GPC and eluted at a rate of 1 mL per min. through the columns maintained at 35° C. The system was calibrated with polystyrene standards using a linear least squares analysis to establish a standard calibration curve. The weight average molecular weight (Mw) and the polydispersity index (weight average molecular weight divided by number average molecular weight (Mn)) were calculated for each sample against this standard calibration curve.

Method for Determining Initial Peel Adhesion Strength

The adhesive tape sample test strips were prepared by removing the easy liner, typically, RF02N, and laminating primed 2 mils (50 micrometer) PET films on the adhesive and then slitting test strips by 25.6 mm×12.7 mm, Two replicates were prepared for each adhesive type/panel. After the tight liner was removed, the exposed adhesive surface was then adhered along the length of a float glass substrate and rolled down 5 times. After being conditioned for 24 hrs at 50% relative humidity (RH) at room temperature (25° C.), the test samples were dwelled for 72 hrs at 65° C. and 90% RH and then return to constant temperature (25° C.) room for 24 hrs prior to adhesion testing. The peel adhesion strength was evaluated using a tensile tester (MTS Insight, available from MTS Systems, Corporation, Eden Prairie, Minn.) equipped with 1000 N load cell, using a crosshead speed of 300 mm per min, at an angle of 180° with the test specimen held in the bottom clamp and the tail in the top clamp.

Method for Chemical Resistance Test

Samples were prepared by slitting test strips 0.5 inch×0.5 inch (1.27 cm×1.27 cm) from each of the adhesive transfer tape samples prepared. For Examples 1-12, the release liner was removed from both sides of the adhesive transfer tape and the tape was placed adhered between two glass slides (such that the edge corresponding to the thickness of the tape was exposed). The glass slides adhered by the adhesive transfer tape were set aside to dwell at room temperature (RT, about 23° C.) for 15 mins and placed in a petri dish. For Examples 13-14, the release liner on one side was removed and the test strips were attached (stuck) to the bottom of a petri dish. The release liner on the second, exposed surface of the test strips was removed (such that the top surface and edges were exposed). The petri dish containing the attached sample test strips were set aside to dwell at room temperature (RT, about 23° C.) for 15 mins. The samples (glass slides with adhesive or test strips) were then submerged in either oleic acid, Banana Boat sunscreen, or a mixture of isopropyl alcohol (IPA) and water at a weight ratio of 75:25 (IPA:$H_2O$) 70° C. for 72 hours. The resistance of the adhesive sample to oleic acid or IPA:$H_2O$ mixture was rated using the following guidelines and reported. The samples were rated as "5" if no swelling, discoloration, or bubbles occurred after 72 hrs; rated as "3" when the samples had slight haze around edge area while the bulk was still clear; rated as "1" if swelling, discoloration and bubbles were observed on the samples.

Method for Haze Measurement

Haze measurements were made using a HunterLab (Reston, Va.) UltrascanPro Instrument in transmission mode. The samples were cut to approximately 5 cm length by 10 cm length. One of the carrier liners was removed and the sample was laminated to a clear piece of 1 mm thick glass plate. The other liner was then removed and the sample was placed in the UltrascanPro to measure transmission though the sample and glass assembly.

Method for Gel Content Test

A known weight of the dry adhesive to be tested was placed on a pre-weighed screen basket. The polymer and screen were immersed in ethyl acetate and allowed to soak for 24 hours. After soaking, any remaining polymer on the screen was washed with more clean solvent and dried at 70° C. for 20 minutes. After drying, the sample was again weighed to obtain the weight of the polymer that remained on the screen. This procedure was repeated until a stable dry weight was obtained. The gel content was calculated as the ratio of the weight of polymer remaining on the screen after soaking divided by the original weight of polymer, multiplied by 100.

Method for Environmental Aging Test

To prepare the environmental aging samples, the easy liner (RF02N) was first peeled off and replaced with a 2 mil thick PET film. Then the samples were cut into 2×4 inch size pieces, and the tight liner (such as J9) of those adhesive pieces were removed, and the samples were laminated on glass slide. After 24 h dwell at room temperature, the samples were transferred to 85° C. and 85% humidity oven for a period of time. We recorded failures if any of the following observations were found, for example, the adhesive film becomes hazy (over 1%), developing bubbles, and if the adhesive slips down from its original position due to gravity (so called slipping), and oozing out from the edge of PET/Glass.

Comparative Example A (CExA)

To a resin reaction vessel equipped with a mechanical stirrer, a condenser and a nitrogen inlet were added 50.0 g hydroxyl terminated polyester PH-56 (a hydroxyl value of 56 mg KOH/g) and 10.0 g of MEK. The solution was heated up to 75° C. followed by the addition with stirring of 2.8 g 1 wt, % DBTDA in MEK and 6.256 g of MODUR MLQ. After 2 hrs reaction, 20 g MEK was added to dilute (i.e., reduce the viscosity of) the system. Then, the temperature was maintained at 75° C. for about 10 hrs or until no free NCO group was observed by FT-IR. Finally 26.5 g MEK was added to adjust the solids content to 50 wt. %, resulting in clear and transparent polyurethane PSA solution. Mw and polydispersity of CExA was 85K and 1.98, respectively, determined by GPC as described above.

The solution was knife-coated on a release liner (RF02N) with 0.4 mm gap between the knife and release liner, to form adhesive coating. The coating was dried in 70° C. oven for 1 hour, then a tight release liner (RF52N) was laminated on the adhesive surface. The dry thickness of this PU adhesive was about 120 micrometers.

Example 1 (Ex1)

To a resin reaction vessel equipped with a mechanical stirrer, a condenser, a thermocouple and a nitrogen inlet were added 100.0 g hydroxyl terminated polyester PH-56 (a hydroxyl value of 57 mg KOH/a), 1.0 g DMPA-0135LV2, 1.0 g YMER N120 and 30.0 g MEK. The solution was heated up to 70° C. with stirring, then added 0.05 g DBTDA and 9.23 g of DESMODUR H. Then, the temperature was maintained at 80±2° C. until the reaction was completed. During the reaction, the desired amount of MEK was added into the system to dilute (i.e., reduce the viscosity of) the system. The reaction was completed when no isocyanate groups were existed, which was monitored by using FT-IR for the disappearance of the NCO peak at around 2274 $cm^{-1}$. Finally the clear viscous solution with a solid content of 40 wt, % was obtained. The GPC data was obtained as described above: Mn=60858, Mw=148224, Mp=96178 and Pd=2.43.

The solution was knife-coated on a release liner (RF02N) with 0.4 mm gap between the knife and release liner, to form adhesive coating. The coating was dried in 70° C. oven for 1 hour, then a tight release liner (RF52N) was laminated on the adhesive surface. The dry thickness of this PU adhesive was about 100 micrometers.

Example 2 (Ex2)

To a resin reaction vessel equipped with a mechanical stirrer, a condenser, a thermocouple and a nitrogen inlet were added 106.0 g hydroxyl terminated polyester PH-56 (a hydroxyl value of 57 mg KOH/g), 1.8 g YMER N120 and 30.0 g MEK. The solution was heated up to 70° C. with stirring, then added 0.05 g DBTDA and 9.39 g of DESMODUR H. Then, the temperature was maintained at 80±2° C. until the reaction was completed. During the reaction, the desired amount of MEK was added into the system to dilute (i.e., reduce the viscosity of) the system. The reaction was completed when no isocyanate groups were existed, which was monitored by using FT-IR for the disappearance of the NCO peak at around 2274 $cm^{-1}$. Finally the clear viscous solution with a solid content of 40 wt. %, was obtained. The GPC data was determined as described above: Mn=53233, Mw=106654, Mw=89260 and Pd=2.0.

The solution was knife-coated on a release liner (RF02N) with 0.4 mm gap between the knife and release liner, to form adhesive coating. The coating was dried in 70° C. oven for 1 hour, then a tight release liner (RF52N) was laminated on the adhesive surface. The dry thickness of this PU adhesive was about 100 micrometers.

Example 3 (Ex3)

To a resin reaction vessel equipped with a mechanical stirrer, a condenser, a thermocouple and a nitrogen inlet were added 100.0 g hydroxyl terminated polyester PH-56 (a hydroxyl value of 57 mg KOH/g), 0.29 n DMPA, 5.18 g YMER N120 and 30.0 g MEK. The solution was heated up to 70° C. with stirring, then added 0.06 g DBTDA and 9.44 g of DESMODUR H. Then, the temperature was maintained at 80±2° C. until the reaction was completed. During the reaction, the desired amount of MEK was added into the system to dilute (i.e., reduce the viscosity of) the system. The reaction was completed when no isocyanate groups were existed, which was monitored by using FT-IR for the disappearance of the NCO peak at around 2274 $cm^{-1}$. Finally the clear viscous solution with a solid content of 40 wt. % was obtained. The GPC data was determined as described above: Mn=42072, Mw=81940, Mp=68480 and Pd=1.95.

The solution was knife-coated on a release liner (RF02N) with 0.4 mm gap between the knife and release liner, to form adhesive coating. The coating was dried in 70° C. oven for 1 hour, then a tight release liner (RF52N) was laminated on the adhesive surface. The dry thickness of this PU adhesive was about 100 micrometers.

Example 4 (Ex4)

To a resin reaction vessel equipped with a mechanical stirrer, a condenser, a thermocouple and a nitrogen inlet were added 100.0 g PRIPLAST 1838 (a, hydroxyl value of 56 mg KOH/g), 2.9 g YMER N120, 30.0 g MEK and 0.29 g BAGDM and 0.04 g butylated hydroxytoluene. The solution was heated up to 80° C. with stirring, then added 0.06 g DBTDA and 13.05 g of TMXDI. Then, the temperature was maintained at 80±2° C. until the reaction was completed. During the reaction, the desired amount of MEK was added into the system to dilute (i.e., reduce the viscosity of) the system. The reaction was completed when no isocyanate groups were existed, which was monitored by using FT-IR for the disappearance of the NCO peak at around 2274 cm-1. Finally the clear viscous solution with a solid content of 40 wt % was obtained. The GPC data was determined as described above: Mn=21036, Mw=110502, Mp=31589 and Pd=5.25.

A coating solution was prepared by mixing 100 g of above polyurethane polymer solution, 0.05 g of KBM-403, 0.12 g of IRGACURE 184 and 0.5 g of XR-5580. The resulting solution were mixed on a roller for 1 additional hour, resulting in a homogenous coating solution.

The solution was knife-coated on a release liner (RF02N) with 0.4 mm gap between the knife and release liner, to form adhesive coating. The coating was dried in 70° C. oven for 1 hr, then a tight release liner (J9) was laminated on the adhesive surface. The adhesive was then exposed to low intensity ultraviolet radiation (a total energy of 1 J/cm2) having a spectral output from 300-400 nm with a maximum at 351 nm, for about 10 min. The dry thickness of the resulting PU adhesive was about 120 micrometers.

Example 5 (Ex5)

To a resin reaction vessel equipped with a mechanical stirrer, a condenser, a thermocouple and a nitrogen inlet were added 100.0 g PRIPLAST 1838 (a hydroxyl value of 56 mg KOH/g), 100 g PRIPLAST 1900 with a hydroxyl value of 57 mg KOH/g, 6.0 g YMER N120, 30.0 g MEK and 0.59 g BAGDM and 0.072 g butylated hydroxytoluene. The solution was heated up to 80° C. with stirring, then added 0.06 g K-DBTDA and 30.99 g of TMXDI, Then, the temperature was maintained at 80±2° C. until the no NCO peak intensity was observed by FT-IR. Then, 1.75 g 2-methyl-1,3-propanediol was added for chain extension. During the reaction, the desired amount of MEK was added into the system to dilute (i.e., reduce the viscosity of) the system. The reaction was completed when no isocyanate groups were existed, which was monitored by using FT-IR for the disappearance of the NCO peak at around 2274 cm$^{-1}$. Finally the clear viscous solution with a solid content of 40 wt. % was obtained. The GPC data was determined as described above: Mn=29000, Mw=94173, Mp=41792 and Pd=3.35.

A coating solution was prepared by mixing 100 g of above polyurethane polymer solution, 0.05 g of KBM-403, 0.12 g of IRGACURE 184 and 0.5 g of XR-5580. The resulting solution were mixed on a roller for 1 additional hour, resulting in a homogenous coating solution.

The solution was knife-coated on a release liner (RF02N) with 0.4 mm gap between the knife and release liner, to form adhesive coating. The coating was dried in 70° C. oven for 1 hr, then a tight release liner (J9) was laminated on the adhesive surface. The adhesive was then exposed to low intensity ultraviolet radiation (a total energy of 1 J/cm2) having a spectral output from 300-400 nm with a maximum at 351 nm, for about 10 min. The dry thickness of the resulting PU adhesive was about 120 micrometers.

Example 6 (Ex6)

To a resin reaction vessel equipped with a mechanical stirrer, a condenser, a thermocouple and a nitrogen inlet were added 205 g PRIPLAST 1838 (a hydroxyl value of 56 mg KOH/g), 5.9 g YMER N120, 0.59 g BAGM and 50.0 g MEK. The solution was heated up to 80° C. with stirring, then added 0.12 g K-KAT XC B221 and 27.84 g of DESMODUR W. The temperature was maintained at 80±2° C. to obtain the acrylate containing polyurethane. During the reaction, the desired amount of MEK was added into the system to dilute (i.e., reduce the viscosity of) the system. The reaction was completed when no isocyanate groups were existed, which was monitored by using FT-IR for the disappearance of the NCO peak at around 2274 cm$^{-1}$. Finally the clear viscous solution with a solid content of 50 wt. % was obtained. The GPC data was determined as described above: Mn=23323, Mw=123304, Mp=40131 and Pd=5.28.

A coating solution was prepared by mixing 100 g of above polyurethane polymer solution, 0.05 g of KBM-403 and 0.12 g of IRGACURE 184. The resulting solution were mixed on a roller for 1 additional hour, resulting in a homogenous coating solution.

The solution was knife-coated on a release liner (RF02N) with 0.4 mm gap between the knife and release liner, to form adhesive coating. The coating was dried in 70° C. oven for 1 hr, then a tight release liner (J9) was laminated on the adhesive surface. The adhesive was then exposed to low intensity ultraviolet radiation (a total energy of 1 J/cm2) having a spectral output from 300-400 nm with a maximum at 351 nm, for about 10 min. The dry thickness of the resulting PU adhesive was about 120 micrometers.

Table 1, below summarizes the amounts of components used in preparing of the Ex1-Ex6 and CExA polyurethane polymer solutions.

TABLE 1

| Components | CExA | Ex1 | Ex2 | Ex3 | Ex4 | Ex5 | Ex6 |
|---|---|---|---|---|---|---|---|
| DESMODUR MLQ | 11.12 | | | | | | |
| DESMODUR H | | 8.30 | 8.01 | 8.22 | | | |
| TMXDI | | | | | 11.22 | 12.95 | |
| DESMODUR W | | | | | | | 11.63 |
| PH-56 | 88.88 | 89.90 | 90.45 | 87.02 | | | |
| PRIPLAST 1838 | | | | | 86.03 | 41.78 | 85.66 |
| PRIPLAST 1900 | | | | | | 41.78 | |
| DMPA - HA0135LV2 | | 0.90 | | | | | |
| YMER N120 | | 0.90 | 1.54 | 4.51 | 2.50 | 2.50 | 2.47 |
| DMPA | | | | 0.25 | | | |
| BAGDM | | | | | 0.25 | 0.25 | 0.25 |
| 2-methyl-1,3-propanediol | | | | | | 0.73 | |

Ex1-Ex6 and CExA samples were tested for haze using the method described above. Before haze testing, the samples were subjected to environmental aging at 65° C. at 90% RH for a predetermined period of time. Table 2, below summarizes the haze data for Ex1-Ex6 and CExA samples.

TABLE 2

| | Environmental aging time (hrs) | | | | | | | | |
|---|---|---|---|---|---|---|---|---|---|
| Example | 0 | 24 | 72 | 96 | 168 | 336 | 480 | 648 | 800 |
| CExA | 2.30 | 0.91 | N/M | 0.62 | 1.20 | 1.01 | 0.62 | N/M | N/M |
| Ex1 | 0.63 | N/M | 0.65 | N/M | 0.65 | 0.66 | 0.68 | 0.7 | 1.6 |
| Ex2 | 0.69 | N/M | 0.67 | N/M | 0.67 | 0.68 | 0.81 | 0.70 | 1.25 |
| Ex3 | 0.20 | N/M | 0.20 | N/M | N/M | -N/M | N/M | N/M | N/M |
| Ex4 | 0.08 | N/M | N/M | 0.07 | N/M | 0.23 | 0.31 | N/M | 0.345 |
| Ex5 | 0.125 | N/M | N/M | 0.12 | N/M | 0.08 | 0.085 | N/M | N/M |
| Ex6 | 0.68 | 1.03 | 1.14 | N/M | 1.2 | N/M | 1.06 | N/M | 1.3 |

*N/M means not measured

Ex1-Ex6 and CExA samples were tested for peel adhesion strength, and chemical resistance using the methods described above. Table 3, below summarizes the peel adhesion strength and chemical resistance data for Ex1-Ex6 and CExA samples.

TABLE 3

| | Initial Peel | | Chemical resistance rating | | |
|---|---|---|---|---|---|
| Example | Peel speed (cm/min) | Adhesion (N/dm) | Oleic acid | BB sunscreen | IPA/water (75/25) |
| CE1 | 30 | 92 | 5 | 3 | 1 |
| EX1 | 30 | 101 | 5 | 5 | 3 |
| EX2 | 30 | 106 | 5 | 5 | 3 |
| EX3 | 30 | 121 | 5 | 3 | 5 |
| EX4 | 6 | 32 | 5 | 5 | 5 |
| EX5 | 6 | 70 | 5 | 5 | 5 |
| EX6 | 30 | 43 | 5 | 5 | 5 |

Example 7 (Ex 7)

In an 8 ounce brown jar, 100 g of polyurethane polymer solution (50% by wt solids in MEK) as described in Example 6, 0.6 g of Irgacure 184 (10% by wt in MEK), 0.5 g of KBM-403 (10% by wt in MEK), and 1.0 g of XR-5580 (50% by wt as supplied) were mixed together. The mixture was sealed and placed on a roller mixer overnight.

Example 8 (Ex 8)

In an 8 ounce brown jar, 80 g of polyurethane polymer solution as described in Example 6, 0.8 g of Irgacure 184 (10% by wt in MEK), 0.4 g of KBM-403 (10% by wt in MEK), 4.0 g of CN9782 (50% by wt solids in MEK) and 0.8 g of XR-5580 (50% by wt as supplied) were mixed together. The mixture was sealed and placed on a roller mixer overnight.

Example 9 (Ex 9)

In an 8 ounce brown jar, 80 g of polyurethane polymer solution as described in Example 6, 0.8 g of Irgacure 184 (10% by wt in MEK), 0.4 g of KBM-403 (10% by wt in MEK), 1.6 g of CN983 (50% by wt in MEK) 4.0 g of CN9782 (50% by wt solids in MEK) and 0.8 g of XR-5580 (50% by wt as supplied) were mixed together. The mixture was sealed and placed on a roller mixer overnight.

Example 10 (Ex 10)

In an 8 ounce brown jar, 80 g of polyurethane polymer solution as described in Example 6, 0.8 g of Irgacure 184 (10% by wt in MEK), 0.4 g of KBM-403 (10% by wt in MEK), 4.0 g of CN9178 (50% by wt solids in MEK) and 0.8 g of XR-5580 (50% by wt as supplied) were mixed together. The mixture was sealed and placed on a roller mixer overnight.

The solutions of Examples 7-10 were knife-coated on a release liner (RF02N) with 0.4 mm gap between the knife and release liner, to form an adhesive coating. The coating was dried in 70° C. oven for 1 hour, then a tight release liner (J9) was laminated on the adhesive surface. The dry thickness of this PU adhesive was about 100 micrometers. The laminated adhesive tape was UV-cured under nitrogen at 100% power (H bulb) with a Light Hammer™ 6 High Power 6-inch UV Curing System (formerly Fusion UV Systems, Inc., Gaithersburg, Md., now Heraeus Noblelight Fusion UV Inc.) 1 pass at 25 fpm. The initial peel adhesion strength was tested according to the test method previously described except that the samples were tested after being conditioned for 24 hours at 50% RH and room temperature (25° C.) and also tested after environmental aging (being dwelled for 24 hours at 85° C. and 85% RH) and then returned to room temperature for 24 hours prior to adhesion testing. The adhesive properties are listed in Table 4.

TABLE 4

| | | Peel adhesion (N/dm) | | |
|---|---|---|---|---|
| Example | Additional Cross-linkers | 25° C./(Failure mode) | 85° C./(Failure Mode) | Gel Content |
| 7 | None | 0.8 (adhesive) | 0.08 (cohesive) | 8.8 |
| 8 | CN9782 | 1.1 (adhesive) | 0.2 (cohesive) | 13.6 |
| 9 | CN983 and CN9782 | 0.96 (adhesive) | 0.15 (adhesive) | 31.9 |
| 10 | CN9178 | 0.76 (adhesive) | 0.15 (adhesive) | 33.0 |

Example 11 (EX 11)

To a resin reaction vessel equipped with a mechanical stirrer, a condenser, a thermocouple and a nitrogen inlet were added 160.0 g PRIPLAST 1838 (a hydroxyl value of 56 mg KOH/g), 40 g PRIPLAST 1900 with a hydroxyl value of 57 mg KOH/g, 6.0 g YMER N120, 30.0 g MEK and 0.74 g BAGDM and 0.072 g butylated hydroxytoluene. The solution was heated up to 80° C. with stirring, then added 0.12 g DBTDA and 30.60 g of TMXDI. Then, the temperature was maintained at 80±2° C. until the no NCO peak intensity change was observed by FT-IR. Then, 1.5 g 2-methyl-1,3-propanediol was added for chain extension. During the reaction, the desired amount of MEK was added into the system to dilute (i.e., reduce the viscosity of) the system. The reaction was completed when no isocyanate groups were existed, which was monitored by using FT-IR for the disappearance of the NCO peak at around 2274 cm$^{-1}$. Finally the clear viscous solution with a solid content of 45 wt. % was obtained. The GPC data was determined as described above: Mn=34249, Mw=173596 and Pd=4.98.

In an 8 ounce brown jar, 88.9 g of polyurethane polymer prepared above (45% by wt solids in MEK), 0.8 g of Irgacure 184 (10% by wt in MEK), 0.4 g of A-174 (10% by wt in MEK), 4.0 g of CN9178 (50% by wt solids in MEK) and 1.0 g of XR-5580 (50% by wt as supplied) were mixed together. The mixture was sealed and placed on a roller mixer overnight.

Example 12 (EX 12)

In an 8 ounce brown jar, 88.9 g of polyurethane polymer prepared as described in Example 11, 0.8 g of Irgacure 184 (10% by wt in MEK), 0.4 g of A-174 (10% by wt in MEK), 4.0 g of CN9178 (50% by wt solids in MEK) and 2.0 g of XR-5580 (50% by wt as supplied) were mixed together. The mixture was sealed and placed on a roller mixer overnight.

Example 13 (EX 13)

In an 8 ounce brown jar, 88.9 g of polyurethane polymer prepared as described in Example 11, 0.8 g of Irgacure 184 (10% by wt in MEK), 0.4 g of A-174 (10% by wt in MEK), 4.0 g of CN9178 (50% by wt solids in MEK) and 3.2 g of XR-5580 (50% by wt as supplied) were mixed together. The mixture was sealed and placed on a roller mixer overnight.

The solutions of Examples 11-13 were coated onto release liner and cured in the same manner as described for Examples 7-10. The samples were subject to environmental aging testing. The results are listed in Table 5.

TABLE 5

| Examples | % XR-5580 | Environmental aging at 85° C./85% humidity | Failure mode |
|---|---|---|---|
| 11 | 1.5 | 150 h | slipping |
| 12 | 2.5 | 275 h | slipping |
| 13 | 4.0 | 380 h | slipping |

In a 5 gallon pail, 4000 g of the polyurethane polymer prepared according to Example 12 (45% by wt solids in MEK), 180 g of CN9178 (50% wt by solids in MEK), 50.2 g of Irgacure 184 (10% by wt in MEK), 18 g of A-174 (10% by wt in MEK), and 90 g of XR-5580 (50% by wt solids as supplied), and 368 g additional MEK were added in and the final solution was placed on a roller mixer for overnight, resulting in a homogenous coating solution with 40.4% solid. The adhesive solution was filtered and pumped at a flow rate of 16 rpm, 20 rpm, and 24 rpm into a 20.4 cm (8-inch) wide slot-type coating die. The slot coating die uniformly distributed a 20.4 cm wide coating onto a substrate moving at 5 ft/min on moving web of easy liner of RF02N. Next, the coating was dried after pass through gap dryers and oven dryers. After the coating was dried, then a tight coating liner (J9) was laminated on the adhesive coating. The adhesive between RF02N and J9 liner was passed through a UV chamber equipped with a VPS/1600 lamp available from Fusion UV Systems Inc. utilizing an H-bulb operated at 100% power. The UV chamber was purged with nitrogen. The flow rate of nitrogen was fixed at 11 scfm (311 liters/min). The adhesive coating thickness was measured at 100 microns (16 rpm flow rate), 125 microns (20 rpm flow rate), and 150 microns (24 rpm flow rate), respectively. The peel adhesion, gel content, and chemical resistance of the samples were measured as follows:

TABLE 6

| | Peel adhesion (N/dm) | | |
|---|---|---|---|
| Examples | 25° C./Failure mode | 85° C./Failure Mode | Gel Content |
| Ex. 12 - 4 mil | 0.92 (adhesive) | 0.19 (adhesive) | 51.6 |
| Ex. 12 - 5 mil | 0.80 (adhesive) | 0.19 (cohesive) | 53.5 |
| Ex. 12 - 6 mil | 0.96 (adhesive) | 0.18 (adhesive) | 52.1 |

TABLE 7

| | Chemical resistance rating | | |
|---|---|---|---|
| Example | Oleic acid/C | BB sunscreen | IPA/water (75/25) |
| EX-12 | 5 | 5 | 5 |
| EX12 - 6 mil | 4 | 5 | 5 |

Example 14 (EX 14)

To a resin reaction vessel equipped with a mechanical stirrer, a condenser, a thermocouple and a nitrogen inlet were added 150 g Priplast 1901 (a hydroxyl value of 55 mg KOH/g), 6.0 g Ymer 120, 0.74 g BAGM and 50.0 g MEK. The solution was heated up to 80° C. with stirring, then added 0.12 g DBTDA and 28.78 g of TMXDI. The temperature was maintained at 80±2° C. to obtain the acrylate containing polyurethane prepolymer with desired NCO content. Then 50.9 g Priplast 3180 (a hydroxyl value of 58.9 mg KOH/g) and 1.0 g 2-methyl-1,3-propanediol were added respectively. During the reaction, the desired amount of MEK was added into the system to dilute the viscosity. The reaction was completed when no isocyanate groups were existed, which was monitored by using FT-IR for the disappearance of the NCO peak at around 2274 cm-1. Finally the clear viscous solution with a solid content of 50% by weight was obtained. The GPC data was: Mn=37829, Mw=127887, Mp=55072 and Pd=3.38

In an 8 ounce brown jar, 100 g of the above polyurethane polymer solution, 3.0 g of TPO-L (10% by wt in MEK), 0.5 g of KBM-403 (10% by wt in MEK), 1.9 g of SR415 and 1.5 g of XR-5580 (50% by wt as supplied) were mixed together. The mixture was sealed and placed on a roller mixer overnight.

The solution of Example 14 was knife-coated on a release liner (RF02N) with 0.4 mm gap between the knife and release liner, to form an adhesive coating. The coating was dried in 70° C. oven for 30 min, then a release liner (J9) was laminated on the adhesive surface. The dry thickness of the adhesive was about 100 micrometers. The laminated adhesive tape was UV-cured under nitrogen at 100% power (H bulb) with a Light Hammer™ 6 High Power 6-inch UV Curing System (formerly Fusion UV Systems, Inc., Gaithersburg, Md., now Heraeus Noblelight Fusion UV Inc.) 1 pass at 25 fpm. The chemical resistance of the adhesive is reported in Table 8.

TABLE 8

| | | Chemical resistance rating | | | |
|---|---|---|---|---|---|
| Example | Oleic acid/C | BB sunscreen | $H_2O$ | IPA | IPA/water (75/25) |
| EX14 | 5 | 5 | 5 | 5 | 5 |

What is claimed is:

1. A pressure sensitive adhesive composition comprising a polyurethane polymer that comprises the reaction product of a polyisocyanate component and a polyol component; wherein the polyol component comprises
    at least 50 wt. % of the total polyol components comprises polyol component having a hydrophilic-lipophilic balance of less than 10; and
    the polyurethane comprises 0.5 to 5 wt.-% of hydrophilic polymerized units derived from polyethylene glycol polymer having a molecular weight of at least 500 g/mole;
    wherein the polyurethane does not comprise a sufficient concentration of hydrophilic groups to render the polyurethane water soluble or water dispersible and the polyurethane polymer further comprises ethylenically unsaturated groups wherein at least a portion of the ethylenically unsaturated groups are pendent.

2. The pressure sensitive adhesive composition of claim 1 wherein the polyol component comprises a polymeric polyester polyol, a polymeric polycaprolactone polyol, or a mixture thereof.

3. The pressure sensitive adhesive composition of claim 1 wherein the polyol component, isocyanate component, or combination thereof comprises at least one six-membered ring structure.

4. The pressure sensitive adhesive composition of claim 1 wherein the polyol component, isocyanate component, or combination thereof comprises alkylene groups having at least 4, 5, or 6 carbon atoms.

5. The pressure sensitive adhesive composition of claim 1 wherein the polyol component comprises an amorphous polymeric polyol.

6. The pressure sensitive adhesive of claim 1 wherein the polyisocyanate component comprises a polyisocyanate that is a liquid at 25° C.

7. The pressure sensitive adhesive of claim 1 wherein the polyol component comprises repeat units of an ortho- or meta- phthalate, and an alkylene group comprising at least 4, 5 or 6 carbon atoms.

8. The pressure sensitive adhesive of claim 1 wherein the polyol component comprises a C36 based polyester polyol.

9. The pressure sensitive adhesive of claim 1, wherein the ethylenically unsaturated groups are the reaction product of a monomer comprising at least two hydroxyl groups and at least two ethylenically unsaturated groups.

10. The pressure sensitive adhesive of claim 1, wherein the polyurethane polymer further comprises the reaction product of a functional acid containing compound represented by the generic formula $(HX)_2 R^1 A$; wherein A is a functional acid group selected from $—CO_2 M$, $—OSO_3 M$, $—SO_3 M$, $—OPO(OM)_2$, $—PO(OM)_2$, wherein M is H or a cation; X is O, S, NH or NR, wherein R is an alkylene group comprising 1 to 4 carbon atoms; and $R^1$ is an organic linking group having a valency of at least 3 and comprises 1 to 50 carbon atoms, optionally includes one or more tertiary nitrogen, ether oxygen, or ester oxygen atoms, and is free from isocyanate-reactive hydrogen containing groups.

11. The pressure sensitive adhesive of claim 10, wherein the polyurethane comprises between 0.001 and 37 mmol A/100g PU.

12. The pressure sensitive adhesive of claim 1 wherein the polyurethane has a weight average molecular weight ranging from 75,000 to 200,000 g/mole before crosslinking of any ethylenically unsaturated groups of the polyurethane.

13. The pressure sensitive adhesive of claim 1 wherein the pressure sensitive adhesive further comprises a multi-(meth)acrylate crosslinker, an acid-reactive compound, or a combination thereof.

14. The pressure sensitive adhesive of claim 13 wherein the crosslinker is a urethane (meth)acrylate oligomer that comprise alkylene oxide repeat units.

15. The pressure sensitive adhesive composition of claim 1 wherein the adhesive has a 180° peel to glass of at least 15 to 200 N/dm at a peel rate of 300 mm/minute at room temperature after a 72 hour dwell time at 65° C. and 90% relative humidity.

16. The pressure sensitive adhesive composition of claim 1 wherein the pressure sensitive adhesive has a chemical resistance rating of 3-5 in oleic acid or a 70% isopropyl alcohol aqueous solution after 72 hours at 70° C.

17. The pressure sensitive adhesive composition of claim 1 wherein the polyurethane polymer is soluble in methyl ethyl ketone.

18. The pressure sensitive adhesive composition of claim 1 wherein polyurethane polymer is dissolved in a non-aqueous organic solvent.

19. The pressure sensitive adhesive composition of claim 1 wherein the polyethylene glycol polymer has a terminal group comprising two hydroxyl groups.

20. A pressure sensitive adhesive composition comprising a polyurethane polymer that comprises the reaction product of a polyisocyanate component and a polyol component; wherein the polyol component comprises
    at least 50 wt.% of the total polyol components comprises polyol component having a hydrophilic-lipophilic balance of less than 10; and
    the polyurethane comprises 0.5 to 5 wt.-% of hydrophilic polymerized units derived from polyethylene glycol polymer having a molecular weight of at least 500 g/mole;
    wherein the polyurethane does not comprise a sufficient concentration of hydrophilic groups to render the polyurethane water soluble or water dispersible; and
    wherein the pressure sensitive adhesive further comprises a multi-(meth)acrylate crosslinker, an acid-reactive compound, or a combination thereof.

21. The pressure sensitive adhesive composition of claim 20 wherein the polyol component comprises a polymeric polyester polyol, a polymeric polycaprolactone polyol, or a mixture thereof.

22. The pressure sensitive adhesive composition of claim 20 wherein the polyol component, isocyanate component, or combination thereof comprises at least one six-membered ring structure.

23. The pressure sensitive adhesive composition of claim 20 wherein the polyol component, isocyanate component, or combination thereof comprises alkylene groups having at least 4, 5, or 6 carbon atoms.

24. The pressure sensitive adhesive composition of claim 20 wherein the polyol component comprises an amorphous polymeric polyol.

25. The pressure sensitive adhesive of claim 20 wherein the polyisocyanate component comprises a polyisocyanate that is a liquid at 25° C.

26. The pressure sensitive adhesive of claim 20 wherein the polyol component comprises repeat units of an ortho- or meta- phthalate, and an alkylene group comprising at least 4, 5 or 6 carbon atoms.

27. The pressure sensitive adhesive of claim 20 wherein the polyol component comprises a C36 based polyester polyol.

28. The pressure sensitive adhesive of claim 20, wherein the polyurethane polymer further comprises the reaction product of a functional acid containing compound represented by the generic formula $(HX)_2 R^1 A$; wherein A is a functional acid group selected from $-CO_2 M$, $-OSO_3 M$, $-SO_3 M$, $-OPO(OM)_2$, $-PO(OM)_2$ wherein M is H or a cation; X is O, S, NH or NR, wherein R is an alkylene group comprising 1 to 4 carbon atoms; and $R^1$ is an organic linking group having a valency of at least 3 and comprises 1 to 50 carbon atoms, optionally includes one or more tertiary nitrogen, ether oxygen, or ester oxygen atoms, and is free from isocyanate-reactive hydrogen containing groups.

29. The pressure sensitive adhesive of claim 20, wherein the polyurethane comprises between 0.001 and 37 mmol A/100g PU.

30. The pressure sensitive adhesive of claim 20 wherein the polyurethane has a weight average molecular weight ranging from 75,000 to 200,000 g/mole before crosslinking of any ethylenically unsaturated groups of the polyurethane.

31. The pressure sensitive adhesive of claim 20 wherein the crosslinker is a urethane (meth)acrylate oligomer that comprise alkylene oxide repeat units.

32. The pressure sensitive adhesive composition of claim 20 wherein the adhesive has a 180° peel to glass of at least 15 to 200 N/dm at a peel rate of 300 mm/minute at room temperature after a 72 hour dwell time at 65° C. and 90% relative humidity.

33. The pressure sensitive adhesive composition of claim 20 wherein the pressure sensitive adhesive has a chemical resistance rating of 3-5 in oleic acid or a 70% isopropyl alcohol aqueous solution after 72 hours at 70° C.

34. The pressure sensitive adhesive composition of claim 20 wherein the polyurethane polymer is soluble in methyl ethyl ketone.

35. The pressure sensitive adhesive composition of claim 20 wherein polyurethane polymer is dissolved in a non-aqueous organic solvent.

36. The pressure sensitive adhesive composition of claim 20 wherein the polyethylene glycol polymer has a terminal group comprising two hydroxyl groups.

* * * * *